US 10,809,732 B2

(12) United States Patent
Wang

(10) Patent No.: US 10,809,732 B2
(45) Date of Patent: Oct. 20, 2020

(54) DETERMINISTIC PATH PLANNING FOR CONTROLLING VEHICLE MOVEMENT

(71) Applicant: Mitsubishi Electric Research Laboratories, Inc., Cambridge, MA (US)

(72) Inventor: Yebin Wang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 72 days.

(21) Appl. No.: 16/140,591

(22) Filed: Sep. 25, 2018

(65) Prior Publication Data

US 2020/0097014 A1    Mar. 26, 2020

(51) Int. Cl.
| | |
|---|---|
| *G05D 1/02* | (2020.01) |
| *B60W 30/06* | (2006.01) |
| *B60W 30/09* | (2012.01) |
| *G05D 1/00* | (2006.01) |
| *G06Q 10/04* | (2012.01) |

(52) U.S. Cl.
CPC ........... *G05D 1/0217* (2013.01); *B60W 30/06* (2013.01); *B60W 30/09* (2013.01); *G05D 1/0088* (2013.01); *G06Q 10/047* (2013.01); *G05D 2201/0213* (2013.01)

(58) Field of Classification Search
CPC .... B60W 30/06; B60W 30/09; G05D 1/0088; G05D 1/0217; G05D 2201/0213; G06Q 10/047
USPC .......................................................... 701/23
See application file for complete search history.

(56) References Cited

U.S. PATENT DOCUMENTS

| | | | | | |
|---|---|---|---|---|---|
| 8,874,477 | B2* | 10/2014 | Hoffberg | .............. | G06Q 20/065 705/37 |
| 2006/0217864 | A1* | 9/2006 | Johnson | ................. | B60N 2/067 701/45 |
| 2010/0299013 | A1* | 11/2010 | Dolgov | ................ | G05D 1/0274 701/25 |
| 2013/0238815 | A1* | 9/2013 | Ogawa | .................... | H04L 29/08 709/244 |
| 2015/0217449 | A1* | 8/2015 | Meier | .................... | B25J 9/1602 700/257 |
| 2016/0161257 | A1* | 6/2016 | Simpson | ................ | G01C 21/00 701/21 |

(Continued)

*Primary Examiner* — Atul Trivedi
(74) *Attorney, Agent, or Firm* — Gennadiy Vinokur; James McAleenan; Hironori Tsukamoto

(57) ABSTRACT

A system for controlling a movement of a vehicle from an initial state of the vehicle and a target state of the vehicle constructs a graph having multiple nodes defining states of the vehicle and including an initial node defining the initial state of the vehicle and a target node defining the target state of the vehicle and determines a path through the graph connecting the initial node with the target node. The system determines the graph using doubletree construction with an initial tree of nodes originating at the initial node and a target tree of nodes originating at the target node. The doubletree construction is configured to select an expandable node in the initial tree or the target tree based on a cost of the expandable node, and expand the graph by adding a child node connected to the expandable node with an edge defined by a collision free primitive motion, such that a cost of the child node is less than the cost of the expandable node.

19 Claims, 25 Drawing Sheets

(56) References Cited

U.S. PATENT DOCUMENTS

| | | | |
|---|---|---|---|
| 2016/0161262 A1* | 6/2016 | Simpson | G05D 1/0291 |
| | | | 701/21 |
| 2016/0300494 A1* | 10/2016 | Trent | G05D 1/0022 |
| 2017/0008521 A1* | 1/2017 | Braunstein | G01C 21/3407 |
| 2017/0192431 A1* | 7/2017 | Foster | G05D 1/0088 |
| 2017/0219353 A1* | 8/2017 | Alesiani | G05D 1/0212 |
| 2018/0095467 A1* | 4/2018 | Perrone | B25J 9/1661 |
| 2018/0130347 A1* | 5/2018 | Ricci | G08G 1/0112 |
| 2018/0150081 A1* | 5/2018 | Gross | G05D 1/0223 |
| 2018/0204111 A1* | 7/2018 | Zadeh | G06K 9/00281 |
| 2018/0247160 A1* | 8/2018 | Rohani | G05D 1/0088 |
| 2018/0259976 A1* | 9/2018 | Williams | G05D 1/0088 |
| 2019/0041845 A1* | 2/2019 | Cella | G05B 19/41865 |
| 2019/0163191 A1* | 5/2019 | Sorin | G05D 1/0274 |
| 2019/0291726 A1* | 9/2019 | Shalev-Shwartz | B60W 40/06 |

\* cited by examiner

DETERMINISTIC PATH PLANNING FOR CONTROLLING VEHICLE MOVEMENT

TECHNICAL FIELD

This invention relates generally to path planning for vehicles, and more particularly to path planning methods for controlling a movement of a vehicle from an initial state into a target space in a deterministic manner.

BACKGROUND

Several control systems employed by vehicles, either autonomous vehicles or vehicles executing in autonomous-driving mode, predict future, safe motions, or paths, of the vehicle, both in order to avoid obstacles, such as other vehicles or pedestrians, but also to optimize some criteria associated to the operation of the vehicle. The target state can either be a fixed location, a moving location, a velocity vector, a region, or a combination thereof. The surroundings, such as road edges, pedestrians, and other vehicles, are sensed by the sensors of the vehicle and/or are at least partially known by a priori given information.

Path planning arises in a variety of applications such as autonomous vehicles, robotics, manufacturing, and computer vision applications. Many planning algorithms have been proposed, including, to name a few, graph-based A* and D* methods, continuous approaches involving navigation function and potential fields; more recently, sampling-based method such as probabilistic roadmaps (PRM), expansive-space trees, rapidly-exploring random trees (RRT), optimal variants RRT* and PRM*, and anytime RRT.

One of the tasks for controlling the autonomous or semi-autonomous vehicles executing in autonomous-driving mode automatically parks a vehicle into a parked position and orientation referred herein as a target state. The parking task can be formulated as the following. Given vehicle dynamics, a map of the parking space, an initial state representing the vehicle's start position and orientation, and a target state representing the vehicle's target parked position and orientation, determine a desired path or motion of the vehicle from the initial state to the target state and then control the actuators of the vehicle, e.g., vehicle's gas pedal and steering wheel, to ensure that the vehicle follows the desired path or motion. However, due to nonholonomic constraints on the motion of the vehicle and a typically narrow free space in the parking space, such as a parking garage or a parking lot, path planning for automatically parking a vehicle is challenging.

A broad spectrum of graph-based approaches search a pre-defined graph, which approximates the configuration space of a robot. The graph is somewhat static in the sense that each node and edge represent the same configuration and connecting path, respectively. Both nodes and edges of the graph are marked as collision-free or occupied during the exploration of search algorithms. Well-established algorithms such as A* and D* achieve resolution-completeness, with optimality guarantee under certain circumstances. Since the complexity of the pre-defined graph grows exponentially along with the dimension of the configuration space, these approaches become practically infeasible for high dimensional systems.

Sampling-based methods may overcome the dimensionality problem, and gain prevalence on high dimensional systems. According to sampling-based methods, instead of using a pre-defined graph, a graph is constructed on-the-fly, where its nodes are randomly drawn from the configuration space. The effectiveness of these methods pivots on efficiency of the graph construction (or equivalently space exploration).

However, the sampling-based methods, such as RRT methods, are computationally expensive. To that end, a number of work exploits biased sampling schemes to improve computation efficiency. For instance, U.S. application Ser. No. 15/402,353 biases the sampling by a set of waypoints, where represent intermediate but milestone configurations. However, even biased sampling can be computationally impractical for some applications.

SUMMARY

It is an object of some embodiments to disclose a motion planning method that allows real-time path generation for automated vehicle control. It is another object of some embodiments to disclose a motion planning method that allows real-time automated vehicle control, e.g., suitable for automated parking system and method. It is another object of some embodiments to provide such a method that reduce the computational cost of the path planning caused by probabilistic nature of sampling methods exploring the state space of a vehicle. It is another object of some embodiments to provide system and method for deterministic exploration of the state space of the vehicle with reduce computational complexity and/or memory requirements.

Some embodiments are based on recognition that an automated vehicle control system for controlling a movement of a vehicle from an initial state of the vehicle and a target state of the vehicle can include a motion planner configured to construct a graph having multiple nodes defining states of the vehicle. A motion planner can use such a graph to explore the state space of the vehicle and to select control actions for moving a vehicle. For example, the nodes of the graph include an initial node defining the initial state of the vehicle and a target node defining the target state of the vehicle. Each pair of nodes in the graph is connected with an edge defined by one of collision free primitive motions moving the vehicle between the states of the connected nodes. A primitive motion is formed by a combination of a control action and an integration time defining the type and the extend of the primitive motion.

Having this graph, the motion planner can determine a path through the graph connecting the initial node with the target node, such that the path defines a sequence of primitive motions moving the vehicle from the initial state to the target state to control the movement of the vehicle using the sequence of primitive motions. However, the challenge for such a system is in constructing the graph in a computationally efficient manner suitable for real-time path generation and control.

Some embodiments are based on understanding that sampling-based path planning methods can be used to find a desired path through a state space having an arbitrarily layout. However, an application of sampling-based path planning methods such as a rapid-exploring random tree (RRT) method and its variants, to the automated control problem can result in a number of wasted computations making this task computationally impractical for real time applications. For example, due to a number of obstacles that can separate a target state from the initial, e.g., current, state of a vehicle, the path to the target state can have different forms and shapes. To that end, in order to find such a path the entire state space may need to be sampled and tested for the path feasibility.

As a result, probabilistic sampling-based path planning methods can unnecessarily sample all unexplored state space resulting in an impractical solution for real-time vehicle control applications. In addition, due to that unnecessary sampling, it is likely that the probabilistic planner outputs a path that is inconsistent with human's intuition. Such a path can be uncomfortable and confusing for a human driver. To that end, additionally or alternatively to an object of computational efficiency, it is an object of some embodiments to generate paths resembling paths that a human operator may select.

Some embodiments are based on several realizations gleaned from observations on behavior and/or rationale of human operators for selecting a path for driving vehicle through a space having obstacles. These observations collectively or individually lead to some embodiments of automatic path planning and control.

First, one embodiment is based on recognition that exploration of the space should be deterministic, i.e., not probabilistic, as how it would be performed by a human operator. Some embodiments incorporate this realization into a planning and control system by constructing a graph connecting an initial state of the vehicle and the target vehicle in a deterministic manner. For example, one embodiment constructs the graph (or tree) by iteratively selecting a node and expanding the selected node with a finite set of pre-defined primitive motions. The challenge of this method is in determining of how to deterministically identify the node to expand and/or how to deterministically select a motion primitive for expending the node to ensure computational efficiency of the method.

Second, one embodiment is based on recognition that a human operator performs the space exploration using not only local, but also global information. For example, a human operator would evaluate a space around the current, i.e., the initial, state of the vehicle and the space around the target state of the vehicle to make a decision about path of the vehicle. Some embodiments are based on realization that the global information can be incorporated into the deterministic graph-based path planning method by constructing two trees forming the graph instead of one tree, i.e., by constructing an initial tree of nodes originating at the initial node corresponding to the initial state of the vehicle and by constructing a target tree of nodes originating at the target node corresponding to the target state of the vehicle. The initial tree represents local information around vehicle, the target tree represents local information around the target of the vehicle, and the relationships between the initial tree and the target tree provide insights on global information.

In addition, this embodiment is based on intuition confirmed by a number of simulations and experiments, that the obstacles surrounding a space can be more efficiently avoided by constructing an "outward tree" from the occluded space to a free space, rather than by constructing an "inward tree" from the free space toward the occluded space. In a number of applications, such as autonomous parking systems, the parking space is typically more occluded than the space in a garage or a parking lot leading toward the parking space. To that end, some embodiments are based on realization that doubletree space exploration can be more computationally efficient than a singletree space exploration and can better adhere to a human intuition.

Some embodiments take advantage of computational efficiency of doubletree space exploration by selecting the node on the initial or target tree to expand. Specifically, some embodiments select an expandable node in the initial tree or the target tree based on a cost of the expandable node, and expend the graph by adding a child node connected to the expandable node with an edge defined by a collision free primitive motion, such that a cost of the child node is less than the cost of the expandable node. In such a manner, deterministic selection and expansion of the trees are achieved.

In addition, as used herein, a cost of a node is a minimum cost for reaching the target node from the initial node through the node and includes a first cost of a first path through nodes of the initial tree (to consider local information around the initial state), a second cost of a second path through nodes of the target tree (to consider local information around the target state), and a third cost of a third path between nodes of the initial tree and the target tree (to consider relationship between initial and target states). Such a selection of expandable nodes allows considering information gleaned from the construction of both trees making the graph extension more computationally efficient. For example, a number of experiments demonstrated that doubletree graph construction determines the graph with less nodes than a singletree graph construction.

Third, one embodiment is based on realization than a node expansion, in addition to a node selection, can also be performed in a deterministic manner to reduce the need to explore the space around the node with all possible primitive motions. To that end, an embodiment selects a first collision free primitive motion that reduces the cost of the expandable node, i.e., without testing subsequent primitive motions. To further reduce the computational burden, some embodiments order a set of primitive motions based on similarity of each of the primitive motions to a primitive motion defining an edge of the graph leading to the expandable node and tests the primitive motions in that order. These embodiments encourage smoothness of vehicle movement, as human operator would want, and, in practice, help to reduce the complexity of the constructed graph.

The reduction of node expansions reduces the sparsity of the constructed graph that on one hand improve computation efficiency, while on another hand reduces options for space exploration. To address this problem created by deterministic node expansions of some embodiments, some implementations vary the sparsity of the graph at different portions of the graph. For example, one implementation maintains a list of potentially expandable node in a memory of motion planner and selects a value of the sparsity based on a length of a list of expandable nodes. The value of the sparsity can be defined by one or combination of an integration time of control actions forming the primitive motions, and a minimum allowed distance between the child node of the expandable nodes to a nearest node in the graph.

Accordingly, one embodiment discloses a system for controlling a movement of a vehicle from an initial state of the vehicle and a target state of the vehicle. The system includes a motion planner including a processor configured to construct a graph having multiple nodes defining states of the vehicle, wherein the nodes include an initial node defining the initial state of the vehicle and a target node defining the target state of the vehicle, wherein each pair of nodes in the graph is connected with an edge defined by one of collision free primitive motions moving the vehicle between the states of the connected nodes, determine a path through the graph connecting the initial node with the target node, such that the path defines a sequence of primitive motions moving the vehicle from the initial state to the target state; and transmit the sequence of primitive motions to a controller of the vehicle configured to control the movement of the vehicle using the sequence of primitive motions.

The motion planner is configured to determine the graph by constructing an initial tree of nodes originating at the initial node and by constructing a target tree of nodes originating at the target node, wherein, to construct the initial tree or the target tree, the motion planner is configured to select an expandable node in the initial tree or the target tree based on a cost of the expandable node, and expand the graph by adding a child node connected to the expandable node with an edge defined by a collision free primitive motion, such that a cost of the child node is less than the cost of the expandable node, wherein the cost of a node is a minimum cost for reaching the target node from the initial node through the node and includes a first cost of a first path through nodes of the initial tree, a second cost of a second path through nodes of the target tree, and a third cost of a third path between nodes of the initial tree and the target tree.

Another embodiment discloses a method for controlling a movement of a vehicle from an initial state of the vehicle and a target state of the vehicle, wherein the method uses a processor coupled with stored instructions implementing the method, wherein the instructions, when executed by the processor carry out steps of the method that includes constructing a graph having multiple nodes defining states of the vehicle, wherein the nodes include an initial node defining the initial state of the vehicle and a target node defining the target state of the vehicle, wherein each pair of nodes in the graph is connected with an edge defined by one of collision free primitive motions moving the vehicle between the states of the connected nodes, wherein the graph includes an initial tree of nodes originating at the initial node and a target tree of nodes originating at the target node, wherein, to construct the initial tree or the target tree, the processor is configured to select an expandable node in the initial tree or the target tree based on a cost of the expandable node, and expand the graph by adding a child node connected to the expandable node with an edge defined by a collision free primitive motion, such that a cost of the child node is less than the cost of the expandable node, wherein the cost of a node is a minimum cost for reaching the target node from the initial node through the node and includes a first cost of a first path through nodes of the initial tree, a second cost of a second path through nodes of the target tree, and a third cost of a third path between nodes of the initial tree and the target tree; determining a path through the graph connecting the initial node with the target node, such that the path defines a sequence of primitive motions moving the vehicle from the initial state to the target state; and transmitting the sequence of primitive motions to a controller of the vehicle configured to control the movement of the vehicle using the sequence of primitive motions.

Yet another embodiment discloses a non-transitory computer readable storage medium embodied thereon a program executable by a processor for performing a method that includes constructing a graph having multiple nodes defining states of the vehicle, wherein the nodes include an initial node defining the initial state of the vehicle and a target node defining the target state of the vehicle, wherein each pair of nodes in the graph is connected with an edge defined by one of collision free primitive motions moving the vehicle between the states of the connected nodes, wherein the graph includes an initial tree of nodes originating at the initial node and a target tree of nodes originating at the target node, wherein, to construct the initial tree or the target tree, the processor is configured to select an expandable node in the initial tree or the target tree based on a cost of the expandable node, and expand the graph by adding a child node connected to the expandable node with an edge defined by a collision free primitive motion, such that a cost of the child node is less than the cost of the expandable node, wherein the cost of a node is a minimum cost for reaching the target node from the initial node through the node and includes a first cost of a first path through nodes of the initial tree, a second cost of a second path through nodes of the target tree, and a third cost of a third path between nodes of the initial tree and the target tree; determining a path through the graph connecting the initial node with the target node, such that the path defines a sequence of primitive motions moving the vehicle from the initial state to the target state; and transmitting the sequence of primitive motions to a controller of the vehicle configured to control the movement of the vehicle using the sequence of primitive motions.

DETAILED DESCRIPTION

It is an object of some embodiments to disclose a path and/or motion planning method that allows real-time path generation for automated vehicle control. It is another object of some embodiments to disclose a motion planning method that allows real-time automated vehicle control, e.g., suitable for automated parking system and method. For clarity purposes only, some embodiments are described in relation to automated parking scenario. However, principles explained in relation to parking scenarios are used by alternative embodiments in other automated vehicle control applications.

Figure 1A:
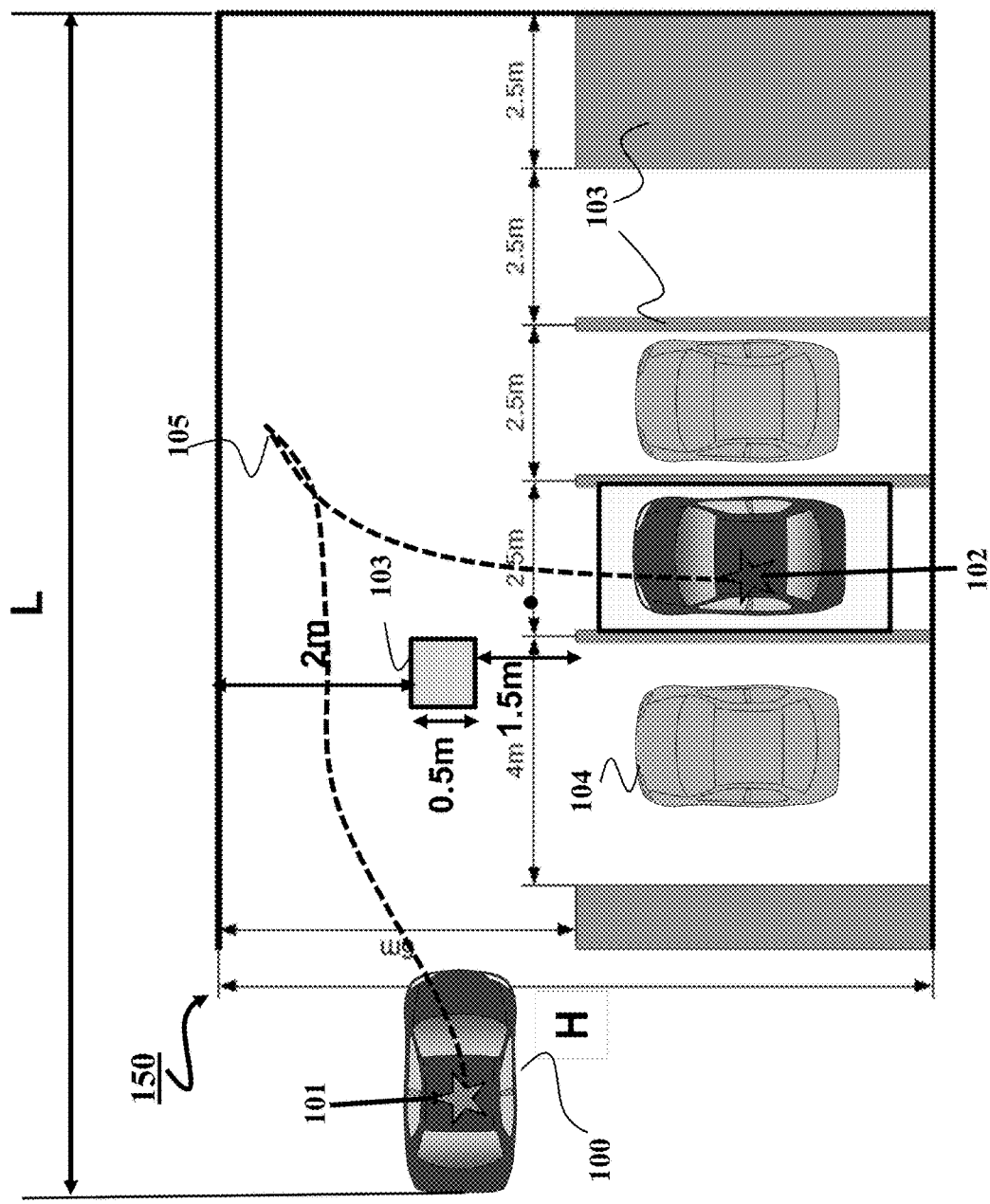
FIG. 1A shows an example of a parking scenario addressed by some embodiments.

FIG. 1A shows an example of a parking scenario addressed by some embodiments. In this example, the boundary of a parking space 150 is represented by a rectangle with a size of L×H. The vehicle 100 has an initial state 101 and needs to be parked at a parking spot defined by a target state 102. Each state, e.g., the initial and the target state, define position and orientation of the vehicle. The parking space 150 includes obstacles. The obstacles can be part of the layout of the parking space, i.e., permanent obstacles 103, such as walls and/or columns of the parking space. Dimensions of the permanent obstacles are usually known, or can be estimated to a reasonable extent. FIG. 1A depicts non-limiting examples of such dimensions.

Additionally, or alternatively, obstacles can include other parked or moving vehicles 104. Geometrical dimensions of the vehicles 104 and the vehicle 100 to be parked can be determined based on the type of the vehicle. For clarity, this disclosure considers a front wheel drive vehicle; although different embodiments are applied to other vehicles including rear wheel drive and full wheel drive vehicles.

In some embodiments, layout of the parking space and position of the obstacles 103 are specified on the map of the parking space. Such a map can be predetermined or constructed in real time during or before the parking task. Various embodiments determine a kinematic path 105 connecting the initial state and the target state such that the kinematic path is feasible and collision free.

Figure 1B:
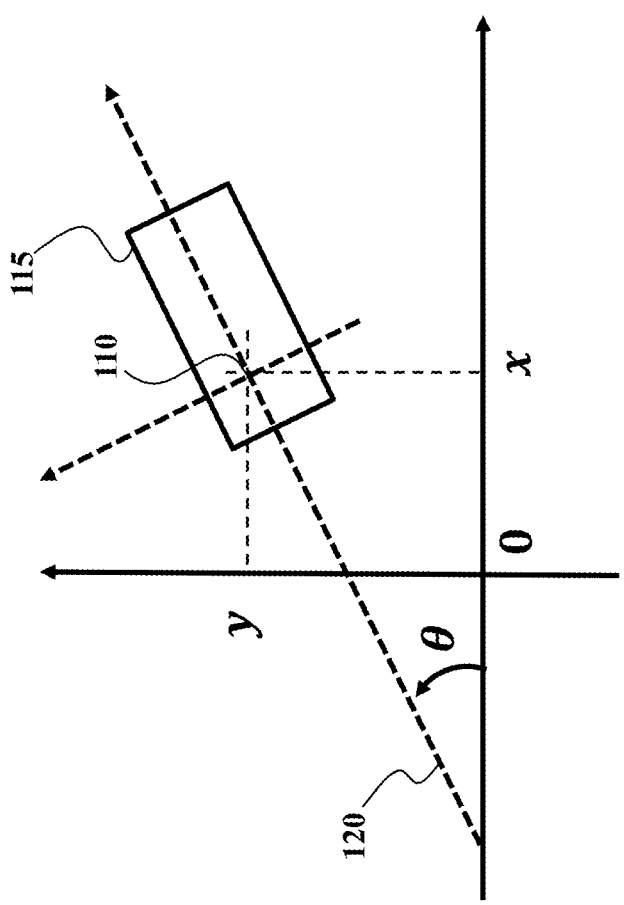
FIG. 1B shows an exemplar schematic of geometrical representation of a vehicle according to some embodiments.

FIG. 1B shows an exemplar schematic of geometrical representation of a vehicle according to some embodiments. In this example, the vehicle is abstracted as a rectangle 115. The vehicle state includes the position (x,y) 110, which represents the midpoint of its rear wheel axis, and the orientation θ 120, which denotes the angle between the vehicle body axis and the horizontal axis.

Path planning is to solve the following problem. Given an initial configuration $X_0 \in \mathcal{C}_{free}$, a goal configuration $X_f \in \mathcal{C}_{free}$, and system (2), find a collision free kinematically feasible path $\mathcal{P}_t$ which
starts at $X_0$ and ends at $X_f$;
lies in the collision-free configuration space $\mathcal{C}_{free}$;
satisfies the system kinematics (2).

Let J(•) be a cost function that assigns to each non-trivial path a non-negative cost. Optimal path planning is to find a collision free kinematically feasible path $\mathcal{P}^*_t: [0,1] \to \mathcal{C}_{free}$ that minimizes J(•).

Motion planning of different embodiments determine how the vehicle moves along the path using kinematic and/or dynamic model of the vehicle 100. For example, a dynamic model of a vehicle accounts for time-dependent changes in the state of the vehicle. Dynamic models typically are represented by differential equations. In one embodiment, the dynamic model of the vehicle is fifth order differential equations $$\begin{aligned}\dot{x} &= \cos(\theta)\cos(\zeta)v \\ \dot{y} &= \sin(\theta)\cos(\zeta)v \\ \dot{\theta} &= \sin(\zeta)\frac{v}{b} \\ \dot{v} &= a_v \\ \dot{\zeta} &= a_s,\end{aligned} \qquad (1)$$

where v the velocity of the front wheels, ζ the angle between the front wheels and the vehicle orientation, $a_v$ the translational acceleration, $a_s$ the steering angular velocity, and b the distance between (x,y) and the midpoint of the front wheels.

In some embodiments, a path is generated according to the dynamic model (1). A dynamically feasible path is a solution of the dynamic model (1). Accordingly, a vehicle state is X=(x,y,θ,v,ζ) Since a vehicle typically starts and ends with zero velocity and steering angle, thus the initial and target state for the dynamic model (1) is $X_0=(x_0,y_0,\theta_0,0,0)$ and $X_f=(x_f,y_f,\theta_f,0,0)$, respectively.

Additionally, or alternatively, some embodiments use a kinematic model of the vehicle for the motion planning that describes motion of the vehicle without consideration of mass of the vehicle or forces that caused the motion. In one embodiment, the following kinematic model is considered $$\begin{aligned}\dot{x} &= \cos(\theta)u_1 \\ \dot{y} &= \sin(\theta)u_1 \\ \dot{\theta} &= u_1 u_2,\end{aligned} \qquad (2)$$

where $u_1=\cos(\zeta)v$ the velocity of the midpoint of the rear wheel axis (named after longitudinal velocity of the vehicle), $u_2=\tan(\zeta)/b$. Without loss of generality, $u_2$ is referred as a (normalized) steering angle.

According to this embodiment, a path is kinematically feasible if it is a solution of the kinematic model (2). A vehicle state X=(x,y,θ) is collision free only if the vehicle located at X does not collide with any obstacle, and lies completely inside the boundary 105. All collision free vehicle states constitute a collision free configuration space $\mathcal{C}_{free}$. The initial state 101 is abbreviated as $X_0=(x_0,y_0,\theta_0)$, and the target state 102 is denoted by $X_f=(x_f,y_f,\theta_f)$. For a specific parking task with a parking space represented by a rectangle L×H, the vehicle state always belongs to a state space χ: [0,L]×[0,H]×[0,2π).

In such a manner, different embodiments can be applied to both the kinematic model and the dynamic model. Without loss of generality, the following description is developed on the basis of the kinematic model.

A tree $\mathcal{T}$ is a union of a node set $V \subset \mathcal{C}_{free}$ and an edge set ε, i.e., $\mathcal{T}=(V,\varepsilon)$. Without causing confusion, node, configuration, and vehicle state are used interchangeably below. An edge $E(X_i,X_j) \in \varepsilon$ represents a collision free kinematically feasible path between nodes $X_i$ and $X_j$. For a finite set V, |V| denotes the number of its elements.

Some embodiments determine whether a vehicle state is without collision based on a geometric representation of the parking space, which is also referred to as a map of the parking space. The map of the parking space is derived by approximating all obstacles and the boundary of the parking space as simple geometric shapes. In one embodiment, obstacles 103 in the environment (equivalently the parking space) can be approximated as rectangles, which are derived by constructing a minimal bounding box for each obstacle. With geometric approximation of obstacles and boundary of the parking space, the parking space or the environment can be fully described by a list of geometric objects.

Figure 1C:
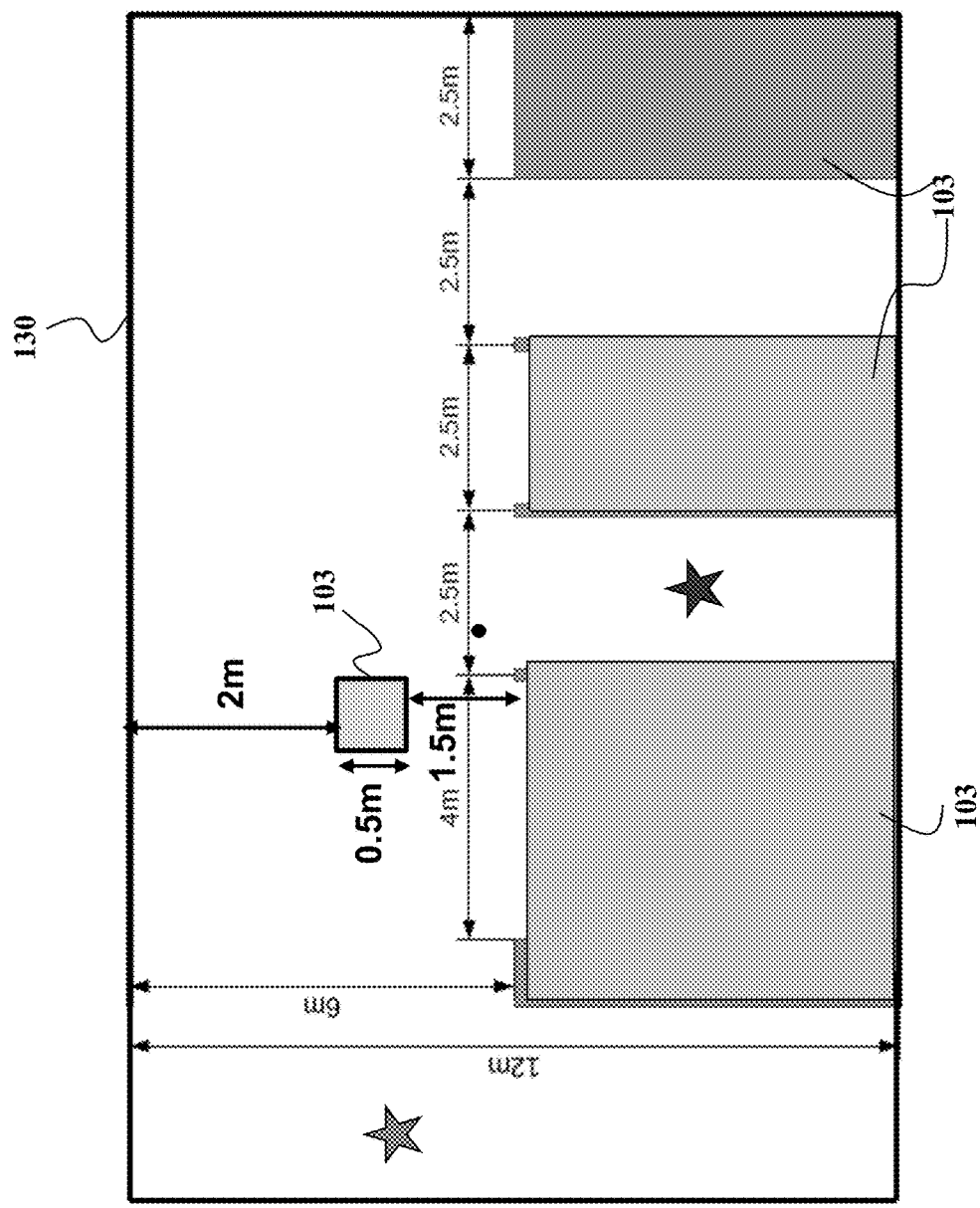
FIG. 1C shows a map of a parking space corresponding to the parking scenario of FIG. 1A.

FIG. 1C shows a map 130 of a parking space corresponding to the parking scenario of FIG. 1A. Both types of obstacles are merged together as one type of permanent obstacles 103 using a rectangular representation. An obstacle can be approximated by multiple geometric shapes, depending on computing power of an onboard processor for path planning. For instance, in another embodiment, obstacles can be approximated by constructing a bounding circle for each obstacle if the computing power is not sufficient. Alternatively, an obstacle can be approximated by a polytope, which however may increase computation burden in path planning. Also, obstacles in the parking space might not be approximated by the same geometric shape. In some embodiments, the environmental map is decomposed into a group of cells, each of which corresponds to a configuration and its neighborhood with a certain volume. Cells could have different volumes. Obstacles in the parking space can be represented by a group of cells.

Figure 2A:
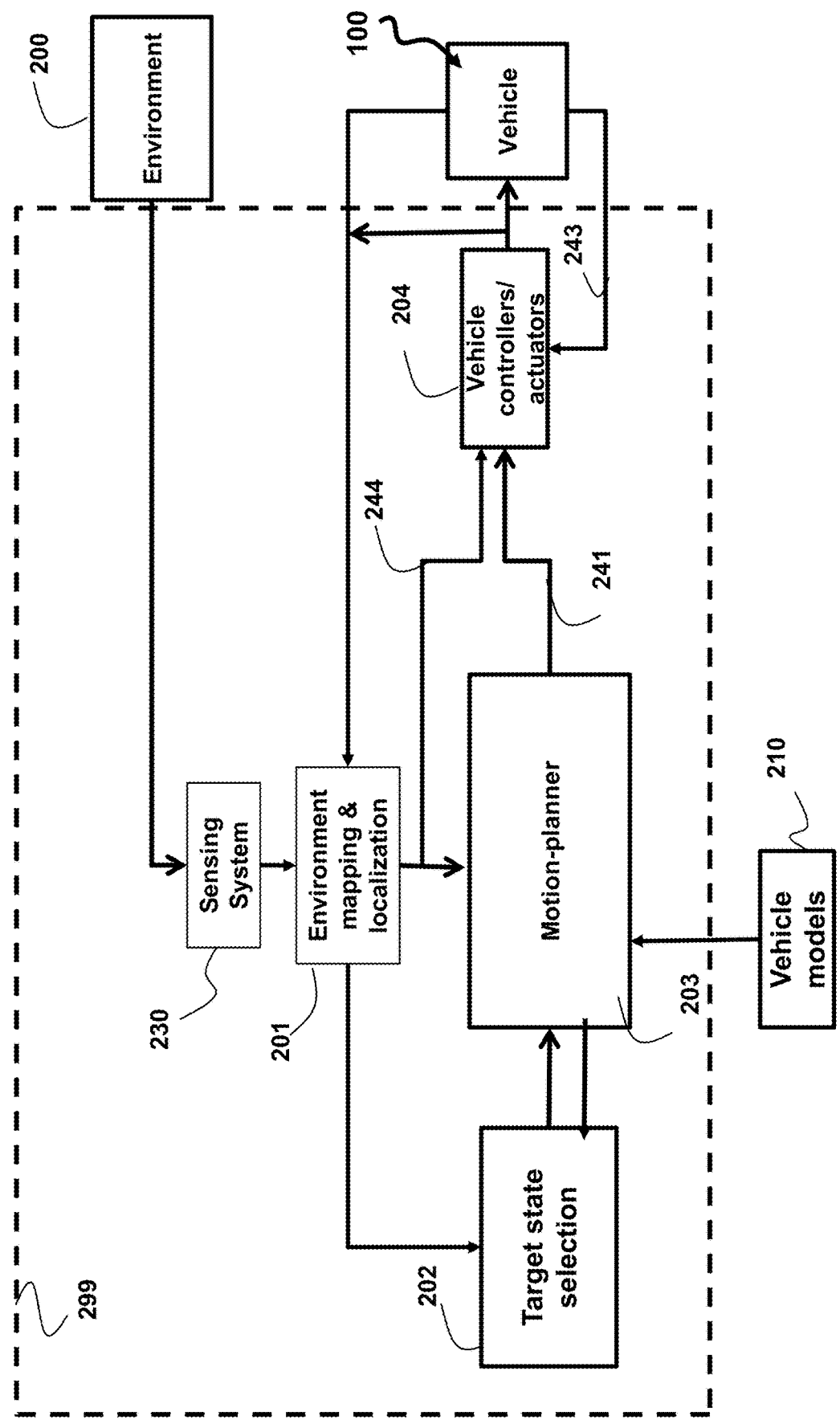
FIG. 2A shows a block diagram of an automated vehicle control system according to one embodiment.

FIG. 2A shows a block diagram of automated vehicle control system 299 according to one embodiment. Environment mapping and localization block 201 constructs or updates the map of the space, e.g., parking space, and determines the current location of the vehicle by sensing the environment and vehicle operation condition. For example, an inertial measurement unit (IMU), which may include 3-axis accelerometer(s), 3-axis gyroscope(s), and/or magnetometer(s), can be used to sense the vehicle operation. A global positioning system sensor can be used to provide position and velocity of the vehicle. Sensors to sense the environment 200 can be video cameras capturing obstacles including other vehicles, pedestrians, and buildings, ultrasonic/radar and LiDAR sensors detecting distance between the vehicle and obstacles, etc. In one embodiment, the environment map is further processed to generate a geometric representation of the parking space as shown in FIG. 1C.

Target state selection 202 selects a target state for a parking spot to park the vehicle by identifying parking lot candidates, and submits the target state to a motion planning block 203. In one embodiment, the available parking spots are tracked by a separate system associated with the management of the parking garage. Additionally, or alternatively, the parking spots can be detected using the sensors 230 of the automated system. In one embodiment, the motion planning block 203 checks to determine whether the target state is parkable, i.e., there is a feasible path to the parking spot, or not, and notifies the target state selection block 202 the check result. If the target state is not parkable, the target selection block 202 selects another target state for evaluation. In another embodiment, the target state selection block 201 can also evaluate whether the target state is parkable, and only sends a parkable target state to the motion planning block.

If the target state is parkable, then the motion planning 203 initiates a complete motion planning procedure to determine a reference trajectory 241 based on one or combination of the vehicle models 210, the initial and target states of the vehicle, and the map of the parking space. The reference trajectory is a sequence of primitive motions of the vehicle. For example, in one embodiment, the reference trajectory defines profiles of the vehicle velocity and steer angle over time. In another embodiment, the reference trajectory defines the profile of the vehicle state (x, y, θ) over time. In most of cases, the reference trajectories various forms are equivalent and one trajectory defines another via the vehicle model.

The motion-planner transmits the reference trajectory determined by the sequence of primitive motions to controller 204 of the vehicle. Given the reference trajectory 241, vehicle controllers and actuators 204 determine and exert control commands to enforce the vehicle state track its reference trajectory 241. In one embodiment, the control commands could be gas pedal pressure and/or steering torque. The vehicle controller/actuators may use signal 243 and 244 to determine control commands. The signal 243 can be a measured steering angle, or measured currents of motors moving the steering wheel or the gas pedal, the output of the IMU, and the current state of the vehicle estimated by the localization block 201.

Figure 2B:
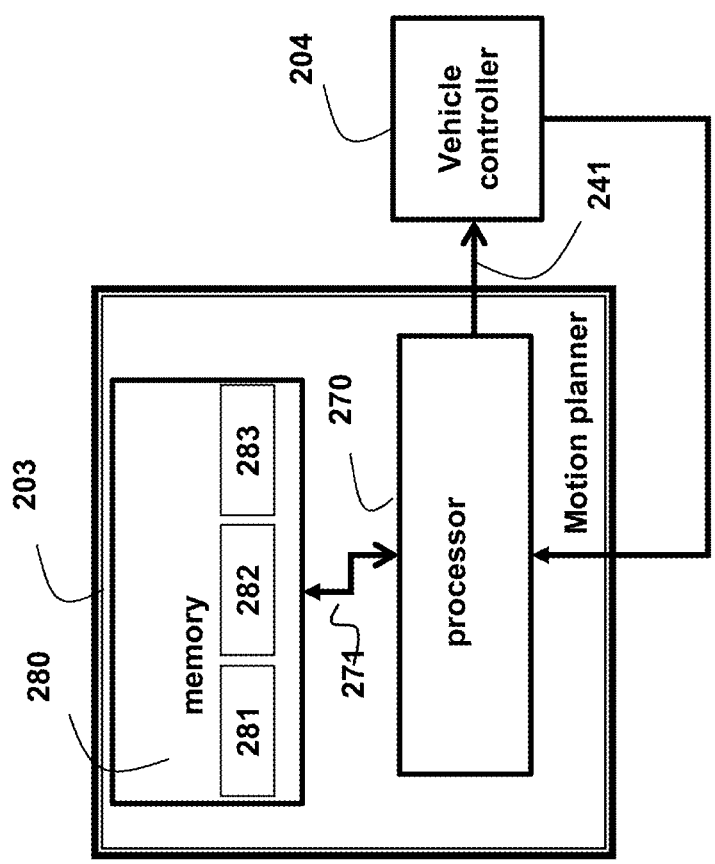
FIG. 2B shows a block diagram of a general structure of the motion-planning system according to one embodiment.

FIG. 2B shows a block diagram of a general structure of the motion-planning system 203 according to one embodiment. The motion-planning system 203 includes at least one processor 270 for executing modules of the motion-planning system 203. The processor 270 is connected 271 to a memory 280 that stores geometrical information 281 such as geometry of the vehicle and a map of the parking space. The memory 280 can also store the models of the vehicle 282 such as a kinematic model of the vehicle and/or a dynamic model of the vehicle. The memory 280 can also store the internal information 283 of the motion planner, including, but not limited to, an initial state of the vehicle, a target state of parked vehicle, cost function, values of each computed state, the motion leading up to each state, a geometric graph, a kinematic graph, waypoints, reference trajectory. In some embodiments, the memory 280 can include stored instructions implementing the method for the automated vehicle control, wherein the instructions, when executed by the processor 270 carry out at least some steps of the method.

Figure 3A:
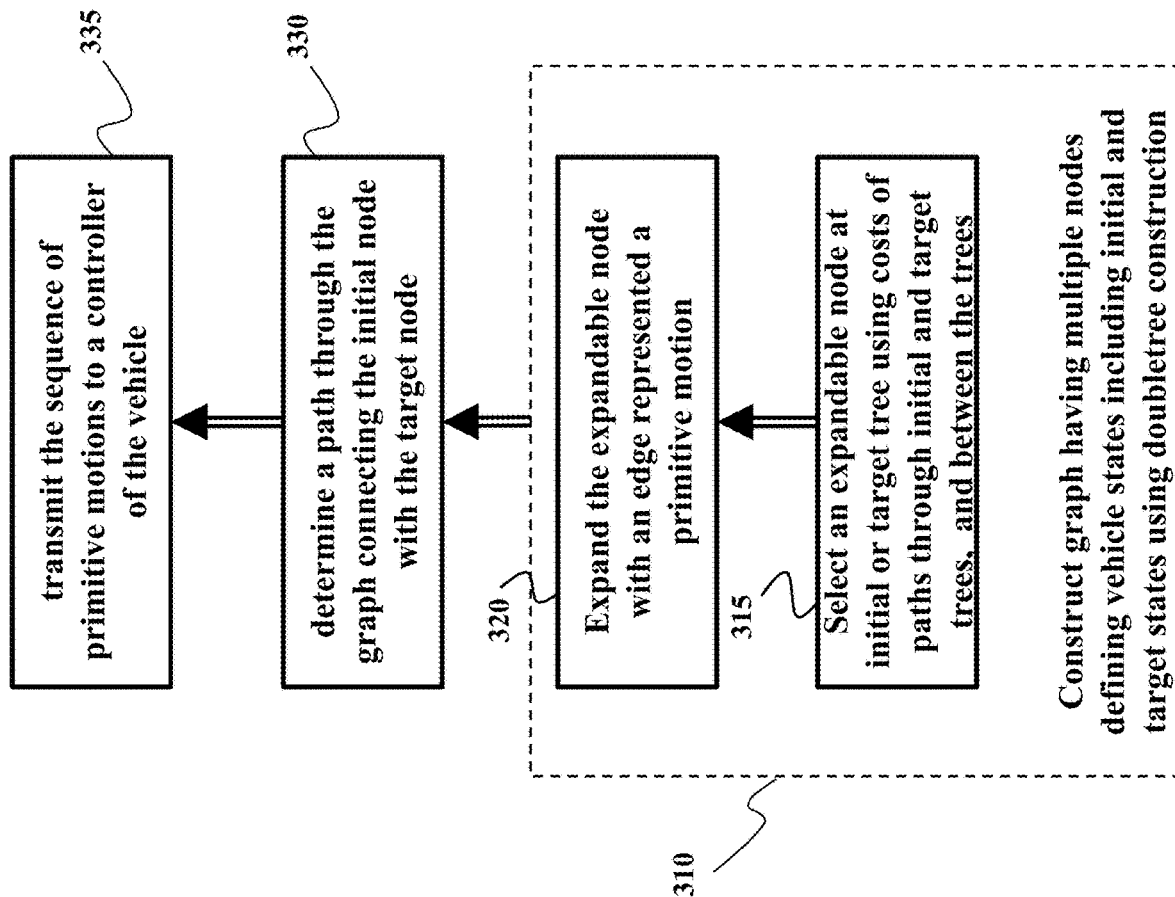
FIG. 3A shows a block diagram of a method performed by a motion planner according to some embodiments.

FIG. 3A shows a block diagram of a method performed by a motion planner 203 of a system 299 for controlling a movement of a vehicle from an initial state of the vehicle and a target state of the vehicle according to some embodiments. The motion planner is configured to construct 310 a graph having multiple nodes defining states of the vehicle. The nodes include an initial node defining the initial state of the vehicle and a target node defining the target state of the vehicle. Each pair of nodes in the graph is connected with an edge defined by one of collision free primitive motions moving the vehicle between the states of the connected nodes.

The motion planner also configured to determine 330 a path through the graph connecting the initial node with the target node, such that the path defines a sequence of primitive motions moving the vehicle from the initial state to the target state; and to transmit 335 the sequence of primitive motions to a controller of the vehicle configured to control the movement of the vehicle using the sequence of primitive motions. Having the graph, the path can be determined using various optimization techniques optimizing a parameter of the path, such as one or combination of its cost and smoothness.

In some embodiments, the motion planner constructs 310 the graph using doubletree construction. Specifically, motion planner determines the graph by constructing an initial tree of nodes originating at the initial node and by constructing a target tree of nodes originating at the target node. To construct the initial tree or the target tree, the motion planner is configured to select 315 an expandable node in the initial tree or the target tree based on a cost of the expandable node, and expend 320 the graph by adding a child node connected to the expandable node with an edge defined by a collision free primitive motion, such that a cost of the child node is less than the cost of the expandable node.

As used herein, the cost of a node is a minimum cost for reaching the target node from the initial node through the node and includes a first cost of a first path through nodes of the initial tree, a second cost of a second path through nodes of the target tree, and a third cost of a third path between nodes of the initial tree and the target tree. In various embodiments, the cost of the node is indicative of one or combination of a travel time of the vehicle from the initial state to the target state through the state of the node, a distance the vehicle travels from the initial state to the target state through the state of the node, a rate of change of a mode of movement of the vehicle traveling from the initial state to the target state through the state of the node.

Some embodiments are based on intuition confirmed by a number of simulations and experiments, that the obstacles surrounding a space can be more efficiently avoided by constructing an "outward tree" from the occluded space to a free space, rather than by constructing an "inward tree" from the free space toward the occluded space. In a number of applications, such as applications of autonomous parking systems, the parking space is typically more occluded than the space in a garage or a parking lot leading toward the parking space. To that end, some embodiments are based on realization that double tree space exploration can be more computationally efficient than a single tree space exploration and better adhere to a human intuition.

Some embodiments take advantage of computational efficiency of double trees space exploration by selecting the node on the initial or target tree to expand. Specifically, some embodiments select an expandable node in the initial tree or the target tree based on a cost of the expandable node, and expend the graph by adding a child node connected to the expandable node with an edge defined by a collision free primitive motion, such that a cost of the child node is less than the cost of the expandable node.

Figure 3B:
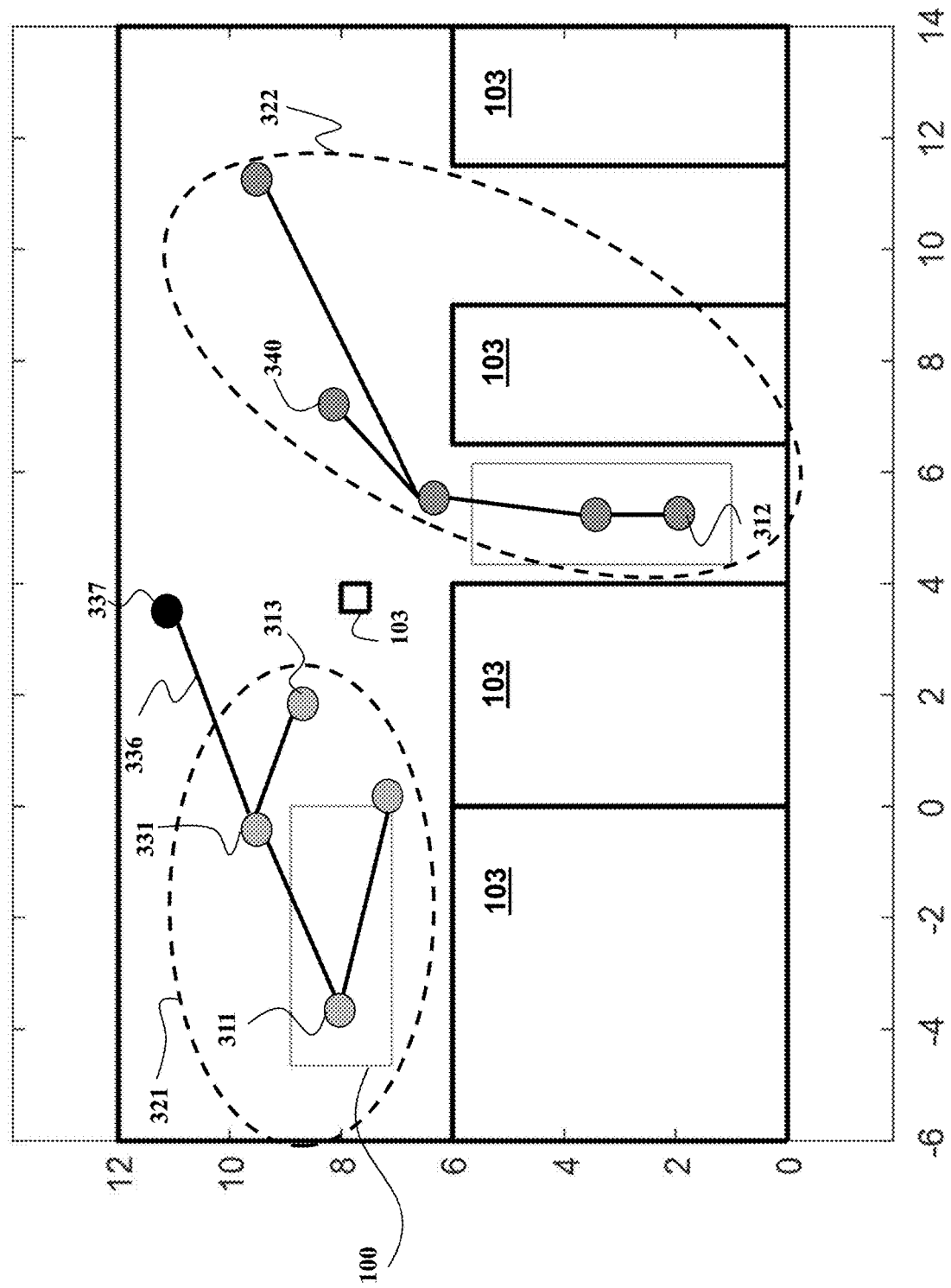
FIG. 3B shows a schematic of determining the graph using doubletree construction according to one embodiment.

FIG. 3B shows a schematic of determining the graph using doubletree construction according to one embodiment. In this example, the graph is constructed from both ends using an initial tree 321, having an initial node 311 corresponding to the initial state 101, and a target tree 322, having a target node 312 corresponding to the target state 102. The initial tree has a node set and an edge set. The target tree also has a node set and an edge set.

During a current iteration, a node 313 from the initial or the target tree is selected based on its cost. In this example, the node 313 is selected from the initial tree. For example, in one implementation, the nodes from the initial or the target tree are selected interchangeably. The node 313 has the minimum cost for reaching the target node from the initial node through the node 313 among all nodes of the initial tree. This node is aimed to be expanded with a child node, and, thus, this node is referred as an expandable node.

The node 313 is selected as an expandable node only if there is a collision free motion primitive that can expand the initial tree by adding a child node connected to the expandable node with an edge defined by that collision free primitive motion. Otherwise, the node 313 is not expandable. To that end, in some embodiments, the motion planner, for selecting the expandable node, is configured to test multiple nodes in an order of their respective costs and to select the first of the tested nodes with the collision free primitive motion reducing the cost of the selected node as the expandable node.

For example, if all primitive motions that can reduce the cost of the node 313 lead to the obstacles 103, then the node 313 is not expandable, and the embodiments select another node, e.g., a node 331 with cost greater than the cost of the node 313 to expand. If the node 331 is expandable, i.e., there is a collision free motion primitive, such as 336 that reduces the cost of the expandable node 331, the embodiment uses the edge 336 defined by this collision free motion primitive to add to the initial tree 321 a child node 337 that have a cost less than the cost of the node 331.

Next, in some implementations, the embodiment expands the target tree, e.g., from the node 341. For example, some embodiments construct initial and target trees alternatively, i.e. one after another. The graph construction continues until a termination condition is reached. For example, in one embodiment, the motion planner stops constructing the graph when the initial tree and the target tree are connected with a collision free Reed-Shepp's path.

In such a manner, deterministic selection and expansion of the trees are achieved. In addition, as used herein, cost of a node is a minimum cost for reaching the target node from the initial node through the node and includes a first cost of a first path through nodes of the initial tree (to consider local information around the initial state), a second cost of a second path through nodes of the target tree (to consider local information around the target state), and a third cost of a third path between nodes of the initial tree and the target tree (to consider relationship between initial and target states). Such a selection of expandable nodes allows considering information gleaned from the construction of both trees making the graph extension more computationally efficient. For example, a number of experiments demonstrated that doubletree graph construction determines the graph with less nodes than a singletree graph construction.

Some embodiments are based on additional realization than a node expansion, in addition to a node selection, can also be performed in a deterministic manner to reduce the need to explore the space around the node with all possible primitive motions. To that end, one embodiment selects a first collision free primitive motion that reduces the cost of the expandable node. To further reduce the computational burden, some embodiments order a set of primitive motions based on similarity of each of the primitive motions to a primitive motion defining an edge of the graph leading to the expandable node and tests the primitive motions in that order. These embodiments encourage smoothness of vehicle movement, as human operator would want, and, in practice, help to reduce the complexity of the constructed graph, because if a motion primitive leading to a node is collision free, it is possible and even likely that the same motion primitive originating at the node is also collision free.

For example, the edge 336 is created by the same primitive motion defining an edge of the graph leading to the expandable node 331. Even if there are other primitive motions that can even further reduce the cost of the node 331, the first tested primitive motion is selected to expand the node.

Figure 3C:
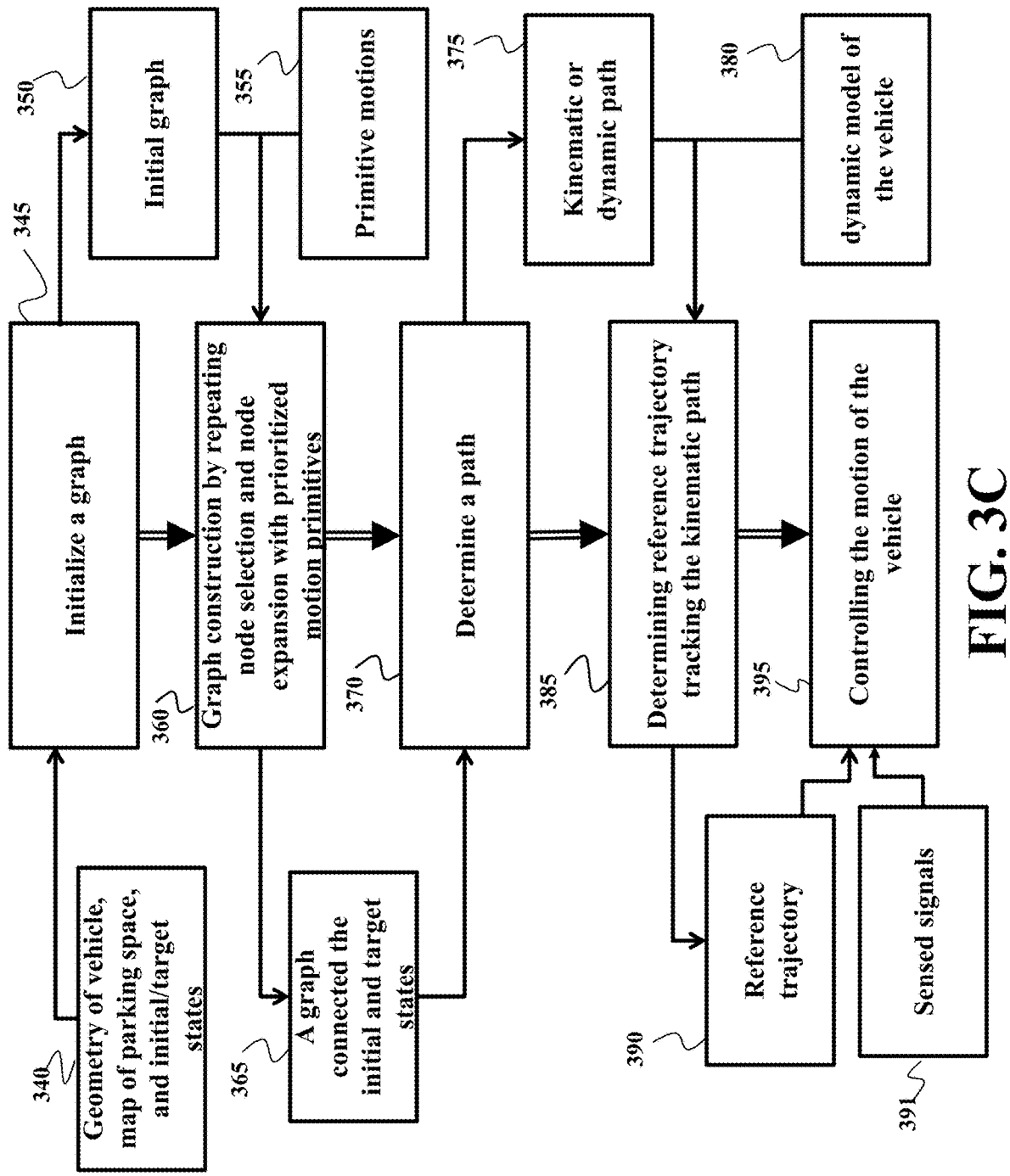
FIG. 3C shows a block diagram of a method for a motion planning method according to some embodiments.

FIG. 3C shows a block diagram of a method for a motion planning method according to some embodiments. Beginning with the geometry of vehicle, the map of the parking space, and initial and target states, the method first initializes 345 a graph $\mathcal{G}$ and outputs an initial graph 350. Based on the initial graph and primitive motions 355, the graph is constructed 360 by repeating two steps: node selection and node expansion using prioritized control actions. As a result, a graph 365 connecting the initial state and the target state or growing into an attraction region of the target state is obtained, and used to determine 370 a kinematic or dynamic path 375. A graph is said growing into an attraction region of the target state if it includes a node which is within ε distance from the target node. The path can include a sequence of primitive motions driving the vehicle from the initial state to the target state. In some embodiments, a reference trajectory is determined 385 on the basis of a kinematic path and the dynamic model of the vehicle 380. In another embodiment a reference trajectory is determined by smoothing the dynamic path 375 based on the dynamic model 380. Reference trajectory 390 is fed into a control module to control 395 the motion of the vehicle such that the vehicle motion follows the reference trajectory, based on sensed signal 391 such as vehicle's current state.

Figure 4A:
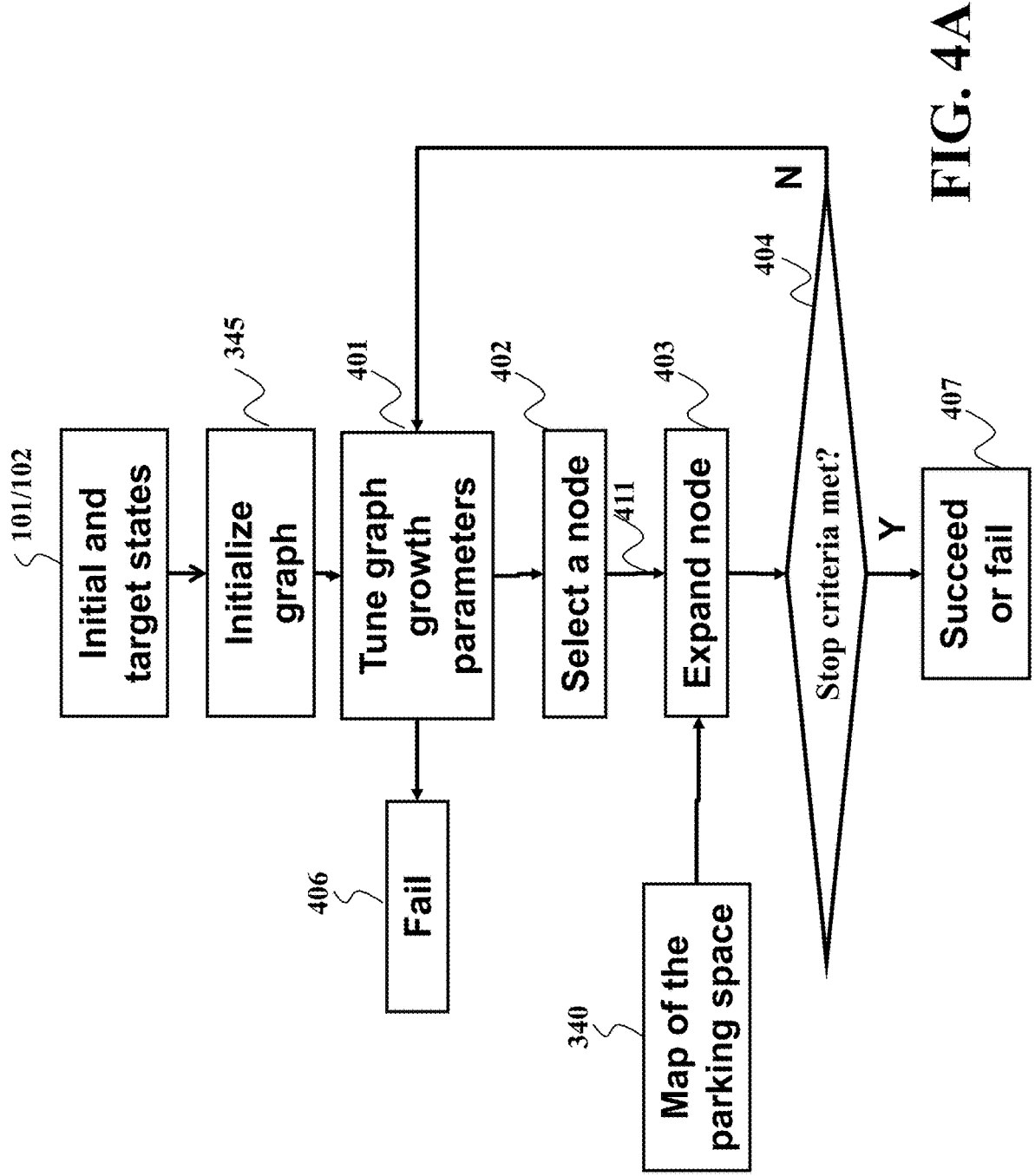
FIG. 4A shows a block diagram of a graph construction method according to one embodiment.

FIG. 4A shows a block diagram of a graph construction method according to one embodiment. The graph is initialized 345 based on the initial and/or target states, pre-set graph growth parameters are first adjusted 401 according to a combination of several metrics. For example, the growth parameters can include one or combination of a set of motion primitives, sparsity of the graph, order of selecting motion primitive for node expansion. The growth parameters allows to construct the graph with non-uniformly distributed nodes having different values of sparsity at different portions of the graph. In some embodiments, the motion planner selects a value of the sparsity based on a length of a list of expandable nodes. The value of the sparsity is defined by one or combination of an integration time of control actions forming the primitive motions, and a minimum allowed distance between the child node to a nearest node in the graph.

In some embodiments, the motion planner stores in a memory one or more lists of expandable nodes. If all expandable node lists are empty, the graph construction stops to select different grows parameters or the method returns failure. Otherwise, an expandable node 411 is selected 402 from an expandable node list. The expandable node 411 is further expanded 403, where prioritized control actions are applied to fulfill the node expansion. Based on the map of the parking space, the node expansion 403 determines possibly none, one, or a set of collision-free child nodes of the expandable node, and accordingly none, one, or a set of collision-free edges between the expandable node and its child nodes. These collision-free child nodes and edges are added to the graph. The construction algorithm terminates if the newly constructed graph meets certain stop criteria; otherwise, repeats tuning 401, selection 402, and expansion 403.

Figure 4B:
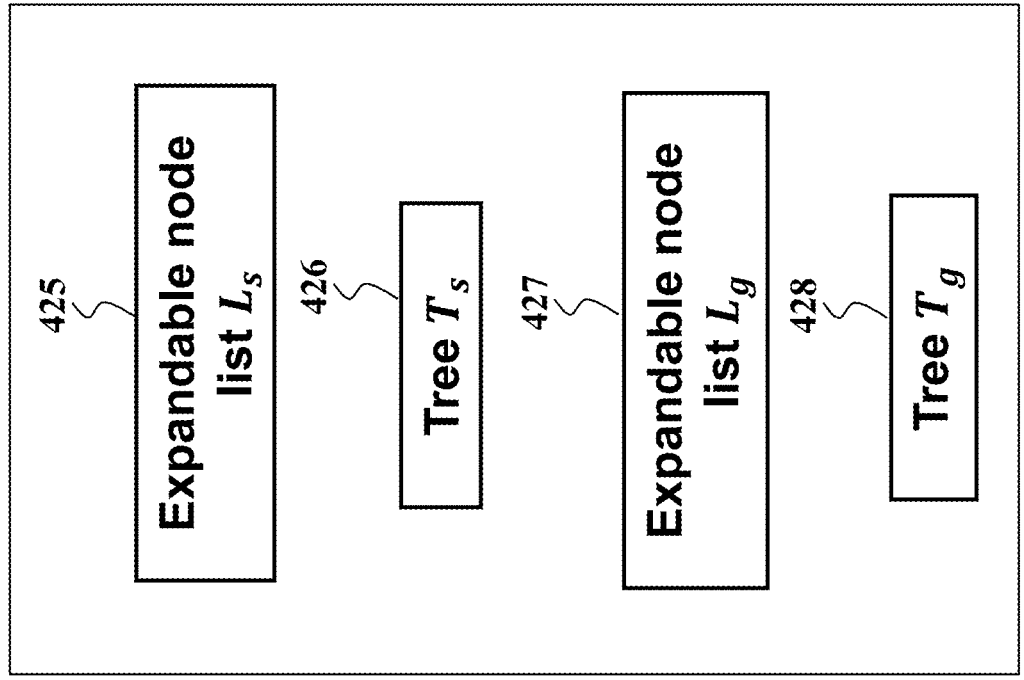
FIG. 4B shows exemplars of data structures representing a graph according to some embodiments.

FIG. 4B shows exemplars of data structures representing a graph according to some embodiments. For example, in one embodiment, a graph $\mathcal{G}$ includes at least a set 431 of nodes, and a set 432 of edges, where a node is created based on a certain collision-free state of the vehicle X. An edge represents a collision free kinematically/dynamically feasible path between two nodes. In one embodiment, the graph includes at least a list 421 of expandable node $\mathbb{L}_{sg}$, and a tree $\mathcal{T}_{sg}$ 422. what tree? The graph initialization 345 creates an initial node based on the initial state, and adds the initial node to the expandable list $\mathbb{L}_{sg}$. To simplify notation without causing confusion, this description uses node and state interchangeably.

In one embodiment, the attraction region of a state is its neighborhood which includes all possible states within a certain distance from the state. A primitive motion is represented by a pair of a pre-defined control action $A_i$ and its integration time $t_{fi}$, or a sequence of states results from applying the pair $(A_i,t_{fi})$ to the vehicle model. In some embodiments, control actions such accelerations are applied to the vehicle dynamic model to obtain states. In another embodiment, control actions such as velocity and steering angle are applied to the vehicle kinematic model to produce the corresponding states.

In some embodiments, a pre-defined control action for the vehicle is a composition of steering angle and longitudinal velocity. For simplicity, let us normalize the steering angle and the longitudinal velocity so that both take values within [−1,1]. Therefore a control action of the vehicle will be defined over a domain [−1,1]×[−1,1]. In order to apply methods taught in this invention, the domain needs approximated to produce pre-defined control actions. In one embodiment, an approximation of the domain is obtained by discretizing the range of the steering angle [−1,1] into several (e.g. 5) possible actions {−1,−0.5,0,0.5,+1}; whereas the range of the longitudinal velocity is discretized into several (e.g. 2) possible actions {−1,+1}. The discretization induces a pre-defined action set including pre-defined control actions. For example, in one embodiment, the pre-defined action set A includes ten elements: {(−1,1),(−0.5,1), (0,1),(+0.5,1),(1,1), (−1,−1),(−0.5,−1),(0,−1),(+0.5,−1), (1,−1)}. The pre-defined control action A can be any element of A.

Similarly, the integration time is a finite positive real number. In one embodiment, the integration time is also normalized such that its domain is [0,1]. For example, one embodiment discretizes its domain into several values. For instance, the domain is uniformly discretized into a finite set of five elements TF={0.2, 0.4, 0.6, 0.8, 1}, and value of $t_{fi}$ is selected from the finite set TF.

Given action set A and integration time set TF, a motion primitive is associated with a pair of (Ai,tfi). In some embodiments, a set of control actions is pre-defined as $$\mathbb{A}=\{A_1,\ldots,A_{|\mathbb{A}|}\};$$

and a set of integration times is denoted $$\mathbb{T}=\{t_{f1},\ldots,t_{f|\mathbb{A}|}\}.$$

Accordingly, |$\mathbb{A}$| primitive motions are defined, with the ith primitive motion corresponds to a pair $(A_i,t_{fi})$.

In some embodiment, each action Ai could have the same integration time. That is TF only contains one element. Motion primitives can be defined accordingly.

In another embodiment, the graph includes a list 425 of expandable node $\mathbb{L}_s$ for the initial tree $\mathcal{T}_s$ 426, and another expandable node list $\mathbb{L}_g$ 427 for the target tree $\mathcal{T}_g$ 428. The graph initialization 345 creates a target node based on the target state, and adds the initial node and target node to the list $\mathbb{L}_s$ and $\mathbb{L}_g$ respectively.

Figure 4C:
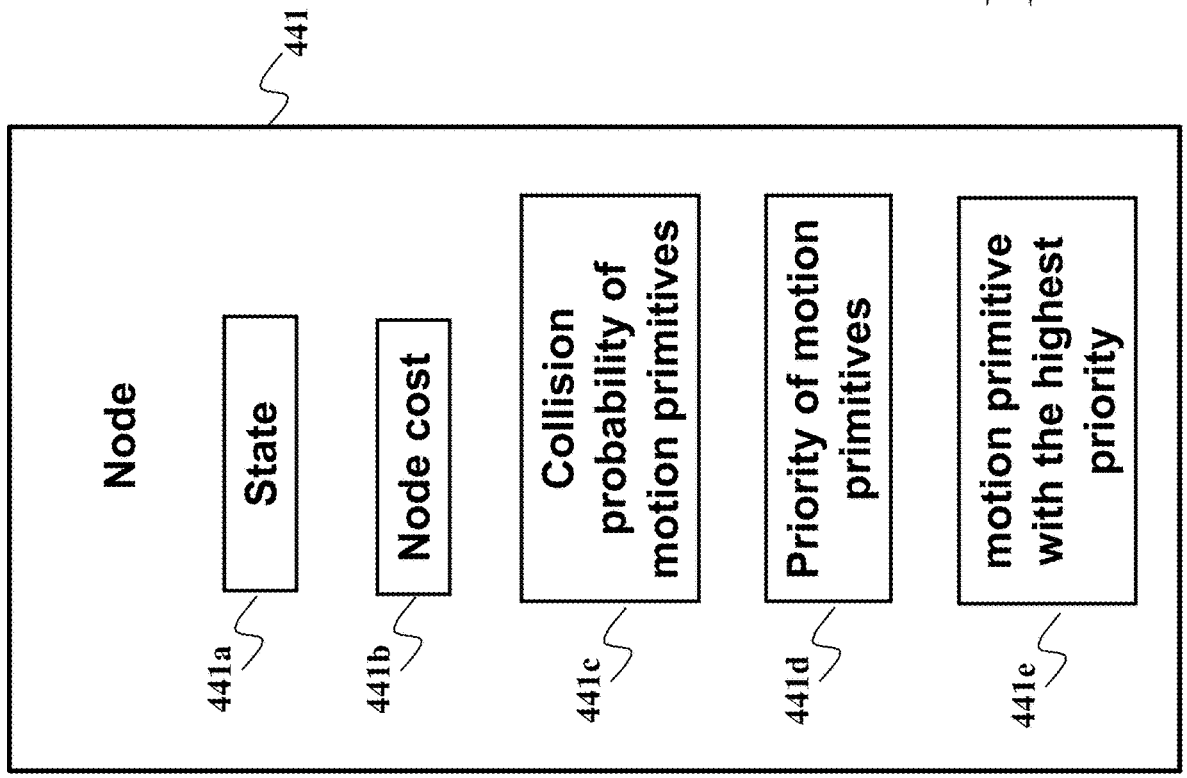
FIG. 4C shows a data structure of a node according to one embodiment.

FIG. 4C shows a data structure of a node according to one embodiment. A node 441 has properties of a state 441a, node cost 441b, collision probability of motion primitives 441c, priority of motion primitives 441d, and motion primitive with the highest priority 441e. For example, a state 441a describes the vehicle configuration or location; the cost 441b describes an estimated cost of a path which passes through the node and connects the initial and target states; collision probability of a motion primitive specifies the estimated likelihood that the motion primitive leads to collision; priority 441d determines which primitive mostly likely leads to reduction of cost.

In some embodiment, the collision probability takes a real value on a continuous domain between 0 and 1; and the priority probability takes a real value on a bounded continuous domain. In another embodiment, the collision probability takes a discrete value from a finite set containing two elements {0,1}|; and the priority takes a discrete value from a finite set containing two elements {0,1}.

In some embodiments, a new child node initially inherits collision probability and priority of motion primitives from its parent, when the node is generated by applying a primitive to the parent. After the parent node is expanded by applying a motion primitive, the collision probability and the priority of the applied primitive is updated according to the outcome of the primitive. For example, if the primitive leads to the new node and a path between the new node and the parent node in collision, then the collision probability of the primitive of the parent node is increased. In an extreme case, the collision probability is set to one. If the primitive leads to the new node giving a lower cost than the parent node, the priority of the primitive of the parent node is increased, otherwise decreased. In some cases, the priority is increased to one or reduced to zero, depending on the cost of the new node. In such a manner, the deterministic approach that takes advantage of the probabilistic estimation of the motion primitives for each expandable node reduces the computational complexity of graph construction.

In one embodiment, the priority of a motion primitive is increased or decreased by an amount, which is linearly proportional to the difference between costs of the parent node and the new node. This embodiment increases relative priority of other motion primitives with respect to parent motion primitive to better consider various options in deterministic graph expansion.

Some embodiments are based on realization that deterministic graph construction 360 leads to the reduction in the number of expandable nodes. In turn, reduction of node expansions increases the sparsity of the constructed graph that on one hand improve computation efficiency, while on another hand reduces options for space exploration. To address this problem created by deterministic node expansion, some embodiments vary sparsity of the graph at different portions of the graph. For example, one implementation maintains a list of potentially expandable node in a memory of motion planner and selects a value of the sparsity based on a length of a list of expandable nodes. For example, the value of the sparsity is defined by one or combination of an integration time of control actions forming the primitive motions, and a minimum allowed distance between the child node of the expandable nodes to a nearest node in the graph.

Figure 5A:
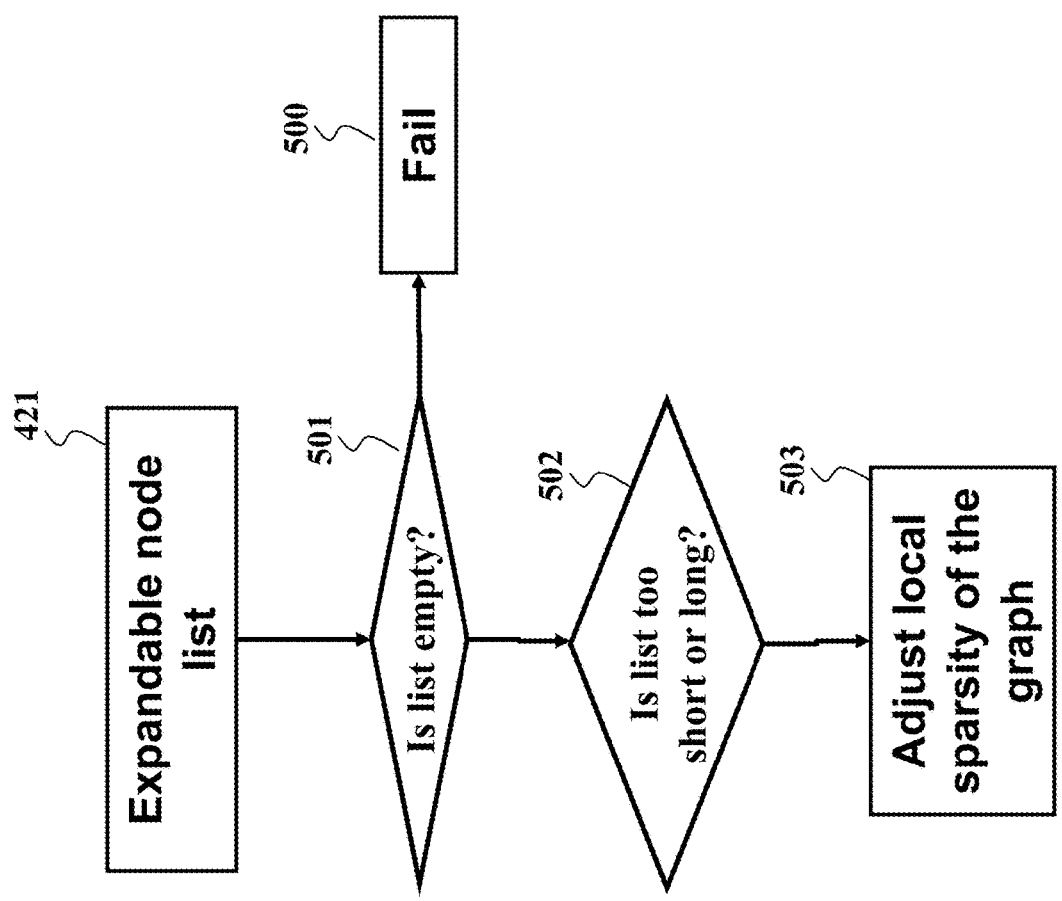
FIG. 5A shows a flow chart of a method for tuning graph growth parameters according to principles of some embodiments.

FIG. 5A shows a flow chart of a method for tuning graph growth parameters 401 for a single tree $\mathcal{T}_{sg}$ of the graph 365 according to principles of some embodiments. The value of the sparsity defining the neighbor of a vehicle state is adjusted 503 according to the length of the expandable node list 502. In particular, if the length of the expandable node list $\mathbb{L}_{sg}$ is below a certain threshold (lower bound), the sparsity defining a distance to a neighbor of a vehicle state is reduced to avoid premature termination of the graph construction (which means no path is feasible). In some embodiments, the sparsity is reduced proportionally and recursively. If the node length goes above another threshold (upper bound), the sparsity is increased proportionally and recursively. The sparsity maintain constants when the length of the node list is between the lower and upper bounds.

Figure 5B:
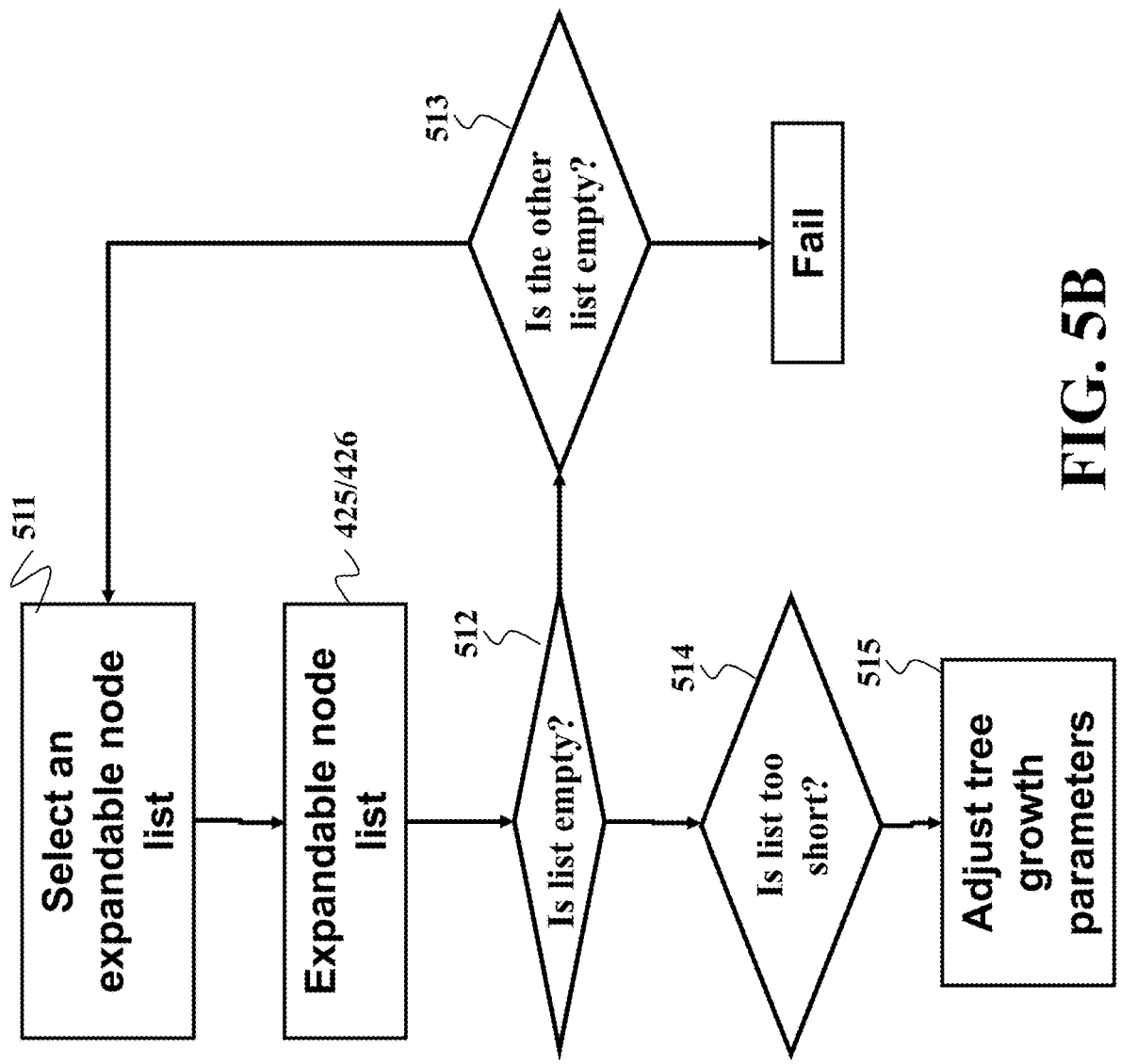
FIG. 5B shows a flow chart of a method for tuning graph growth parameters according to another embodiment.

FIG. 5B shows a flow chart of a method for tuning graph growth parameter 402, for a doubletree graph $\mathcal{T}_s, \mathcal{T}_g$ according to some embodiments. Some principles of these embodiments are similar to sparsity adjustment of FIG. 5A. The block 402 returns failure only if both expandable node lists $\mathbb{L}_s$, $\mathbb{L}_g$ are empty. Each tree can have the same or different values of growth parameters, depending on the status of its respective expandable node list.

Figure 5C:
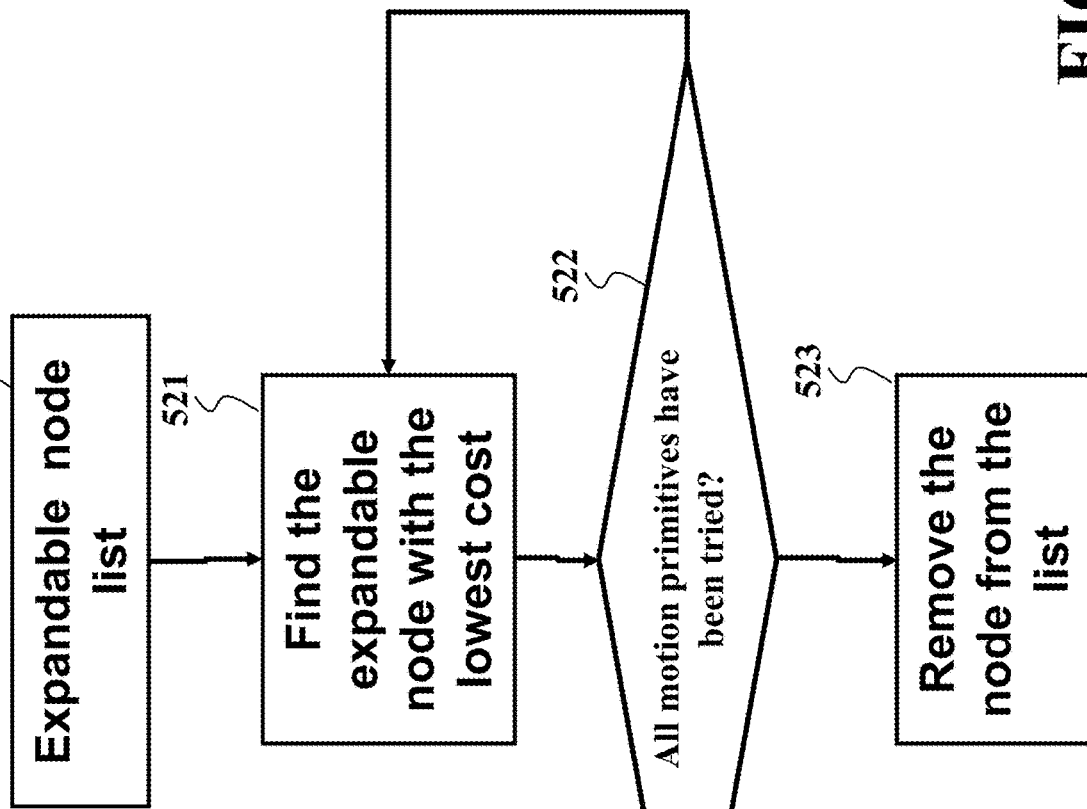
FIG. 5C shows a block diagram of a method for selecting an expandable node from the list of expandable nodes according to some embodiments.

FIG. 5C shows a block diagram of a method for selecting 402 an expandable node from the list of expandable nodes according to some embodiments. Normally, some embodiments select the node having the lowest estimated cost in the expandable node list. If the expandable node has been fully expanded (all control actions have been tried), the node is removed 523 from the list, and the algorithm ought to find the lowest cost node from the new expandable node list.

Figure 5D:
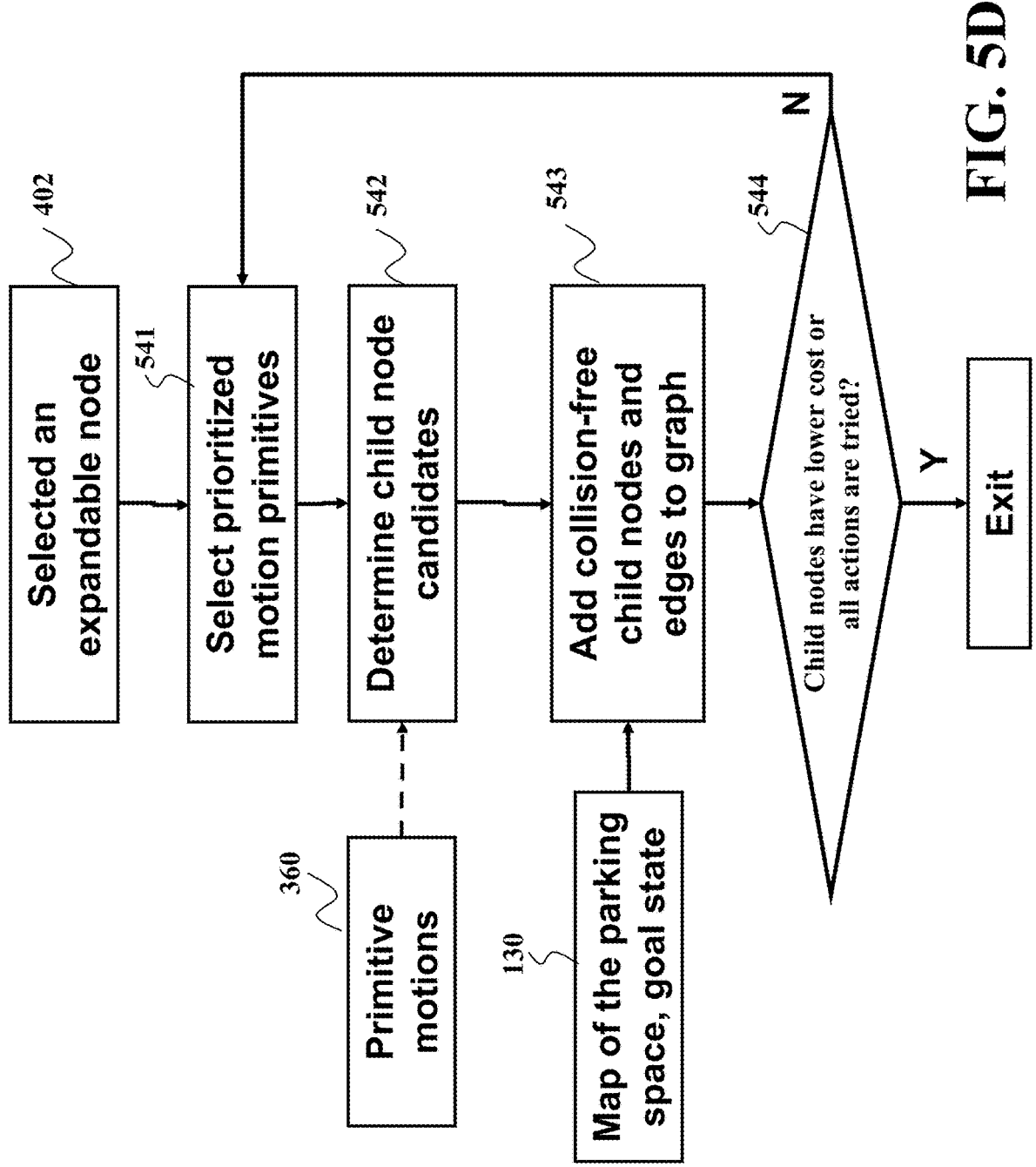
FIG. 5D shows a block diagram of node expansion according to one embodiment.

FIG. 5D shows a block diagram of node expansion 403 according to one embodiment. With the selected expandable node $X_{best}$, a control action $A_i$ or a subset of control actions $\mathbb{A}_i$ with the high priority are selected 541 and applied to determine 542 child nodes candidates X, using primitive motions corresponding to the selected control actions. In some embodiments, a child node candidate can be obtained by integrating the vehicle model with the initial condition $X_{best}$ and the selected control action $A_i$ for a pre-defined time period $[0, t_{fi}]$. Note that $t_{fi}$ could be different for different control actions.

In some embodiments, a primitive motion specifies a control action $A_i$ and time period $t_{fi}$ applied to the vehicle model. A primitive motion is stored in memory either in the form of the pair $(A_i, t_{fi})$, or a sequence of states result from the corresponding control action and time period. The sequence of states are obtained by integrating the vehicle kinematic or dynamic model with a zero initial condition and the corresponding primitive motion.

As shown in FIG. 5D, a child node candidate X and the edge $(X_{best}, X)$ are added to the node set and the edge set of the graph, respectively, only if the path as a result of the primitive motion between $X_{best}$ and X is collision free, using the map information 130. A node cost of the child node X is estimated as F(X), and checked 544 whether it is lower than the node cost of $X_{best}$. If yes, the node expansion exits; otherwise, which is the case $X_{best}$ still has the lowest node cost, another control action or a subset of control actions is selected to continue the expansion of the node $X_{best}$.

Figure 5E:
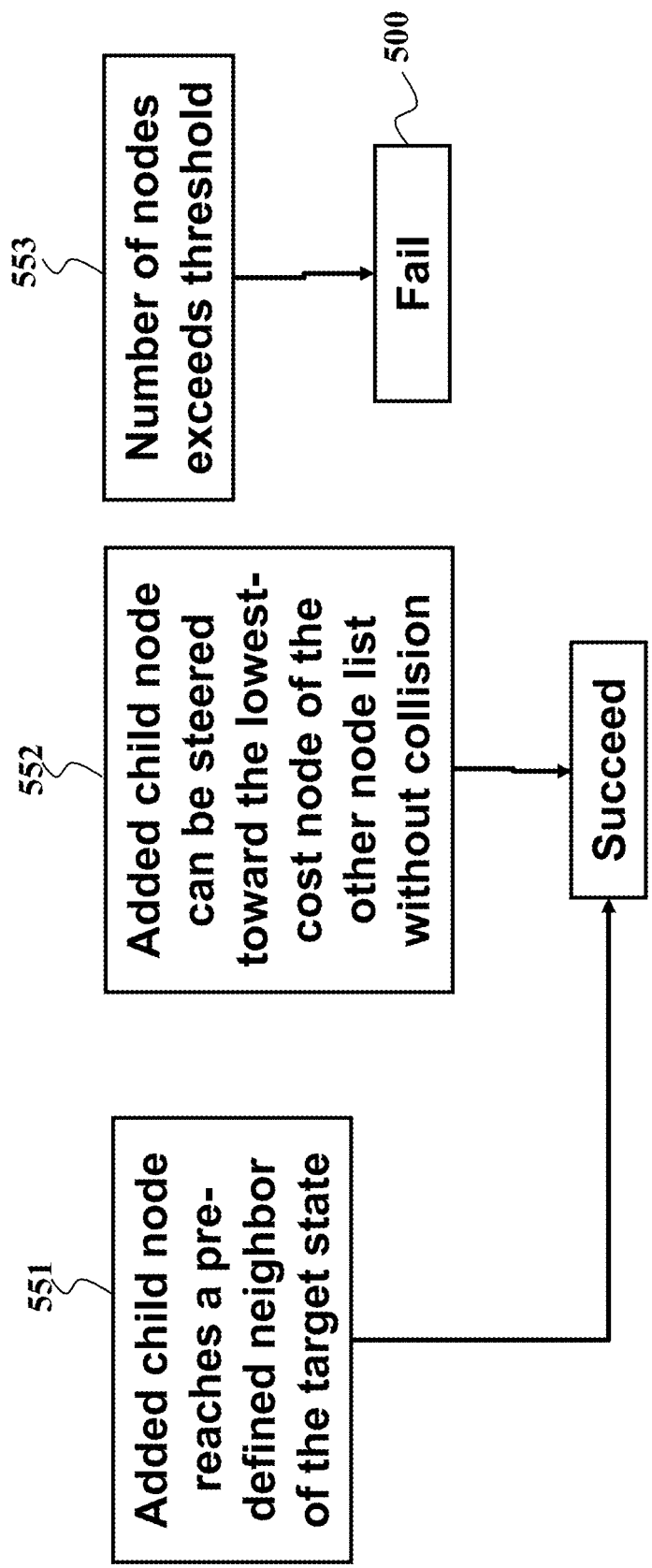
FIG. 5E shows a block diagram of several stop criteria used by some embodiments to terminate the iterative graph construction.

FIG. 5E shows a block diagram of several stop criteria used 404 by some embodiments to terminate the iterative graph construction. In one embodiment, a test is conducted 551 to check whether the added child node is close enough to $X_f$ (reaches a pre-defined neighbor of $X_f$). In another embodiment, one tries to construct 552 a standard Reeds-Shepp's path between the added child node and $X_f$ and verifies 552 if the Reeds-Shepp's path is collision free. If it is, then the Reeds-Shepp's path is added to the edge set of the graph, and the graph construction stops. The graph construction can terminate if the number of nodes exceeds a threshold, in which case the method fails to find a feasible path between $X_0$ and $X_f$.

Some embodiments, in order to perform deterministic selection and expansion of the trees determine the cost of the node to expand by taking an advantage from doubletree graph construction. In some embodiments, the cost of a node is a minimum cost for reaching the target node from the initial node through the node and includes a first cost of a first path through nodes of the initial tree (to consider local information around the initial state), a second cost of a second path through nodes of the target tree (to consider local information around the target state), and a third cost of a third path between nodes of the initial tree and the target tree (to consider relationship between initial and target states). Such a selection of expandable nodes allows considering information gleaned from the construction of both trees making the graph extension more computationally efficient. For example, a number of experiments demonstrated that doubletree graph construction determines the graph with less nodes than a singletree graph construction.

In some embodiments, the graph includes two trees $\mathcal{T}_s$ and $\mathcal{T}_g$, where the former has a root node $X_0$, and the latter has a root node $X_f$. Tree $\mathcal{T}_s$ and $\mathcal{T}_g$ are alternatively chosen for expansion in 511. That is, block 511 selects the expandable node list by alternatingly choosing list $\mathbb{L}_s$ and list $\mathbb{L}_g$. In some embodiments, for a current node X, its arrival cost (first cost) and estimated cost-to-go (second cost) are determined differently.

In one embodiment, each node (state) X is assigned a cost through a properly defined function $F(\bullet)$:

$$F(X)=g(X_0,X)+h(X,X_f),$$

where $g(X_0,X)$ represents the arrival cost from the initial node (state), or a first cost, from $X_0$ to X; and $h(X,X_f)$ denotes the estimated cost-to-go, or a second cost, from X to $X_f$. The F-value for a node X is an estimated cost of a potential path from $X_0$ to $X_f$ while passing through the node.

In one embodiment, the arrival cost $g(X_0,X)$ sums up the costs of all edges from $X_0$ to X, where a cost of an edge is a path-cost $l(X_0,X)$ representing the length of a collision-free kinematically/dynamically feasible path between $X_0$ and X. In another embodiment, the arrival cost additionally includes a control-cost $c(u(X_0),u(X))$ penalizing the change of control actions along the path from $X_0$ to X, where $u(X)$ denotes the action leading to X.

Figure 6A:
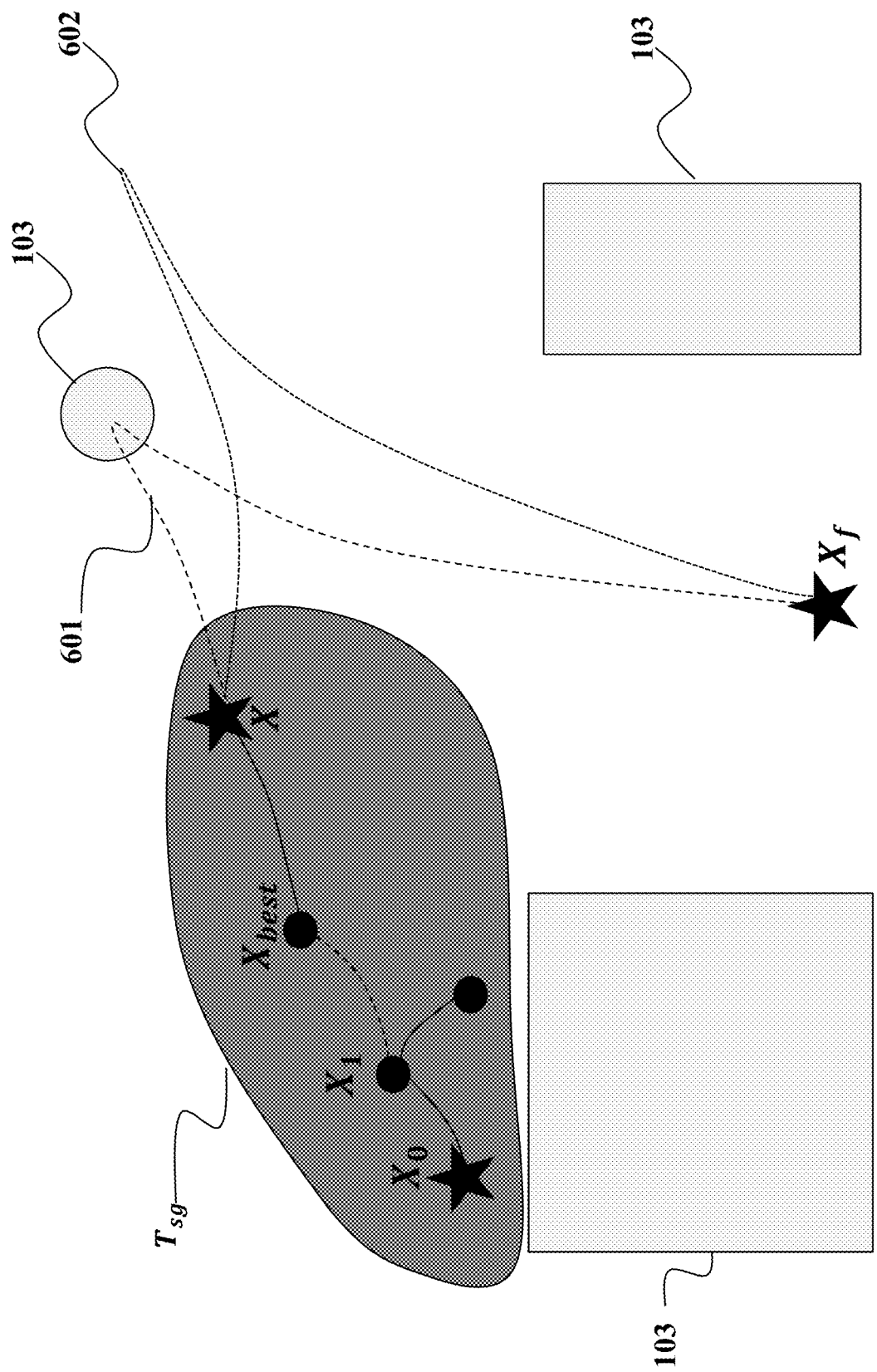
FIG. 6A shows schematics of a method to determine a cost $F(X)$ for a node X when the target tree includes only a target node according to one embodiment.

FIG. 6A shows schematics of a method to determine a cost F(X) for a node X when the target tree includes only a target node according to one embodiment. In FIG. 6A, the path between $X_0$ and $X_f$ is represented by edges ($X_0$, $X_1$), . . . , ($X_{best}$,X), and thus path-cost can be exactly determined by the length of these edges, i.e., $$l(X_0,X)=l(X_0,X_1)+\ldots+l(X_{best},X).$$

Similarly, the control cost is $$c(u(X_0),u(X))=c(0,u(X_1))+\ldots+c(u(X_{best}),u(X)).$$

In some embodiments, the cost-to-go $h(X,X_f)$ captures exactly the path-cost $l(X,X_f)$ representing the length of a collision-free kinematically/dynamically feasible path between X and $X_f$. Since the graph constructed hasn't reached the target $X_f$, one could not find a series of edges connecting X to $X_f$ which means $l(X,X_f)$ is unknown. Hence the estimated cost-to-go $h(X,X_f)$ is in place of $l(X,X_f)$. In some implementations, $h(X,X_f)$ is an estimated path-cost $l_e(X,X_f)$ representing a kinematically/dynamically feasible path between X and $X_f$ without considering obstacles and a collision-cost $l_c(X,X_f)$ accounting for the impact that the obstacles impose on the estimated path-cost.

For example, assume there exists a kinematically/dynamically feasible path 601 between X and $X_f$ and its cost $l_e(X,X_f)$. In fact, the path 601 is in collision with a circular obstacle 103, and thus $l_e(X,X_f)$ is not the true cost-to-go. Instead, the true cost-to-go corresponds to a path 602, which has a higher cost-to-go than $l_e(X,X_f)$. $l_c(X,X_f)$ is used to approximate the difference $l(X,X_f)-l_e(X,X_f)$.

In some embodiments, $l_e(X,X_f)$ is calculated according to a p-norm of the vector $X-X_f$ denoted by $|X_f-X|_p$. In another embodiment, $l_e(X,X_f)$ is the length of a Reeds-Shepp's path between X and $X_f$. In some embodiments, $l(X,X_f)-l_e(X,X_f)$ is a monotonic function of a collision metric $f_c(\bullet)$. The collision metric can be constructed as a group Gaussian mixture models, where all vertices of each obstacle are used to construct a Gaussian model. For a node, its collision metric can be evaluated as $f_c(X)$. The higher $f_c(X)$ is, the more likely the neutral path between X and $X_f$ ends up with collision.

Figure 6B:
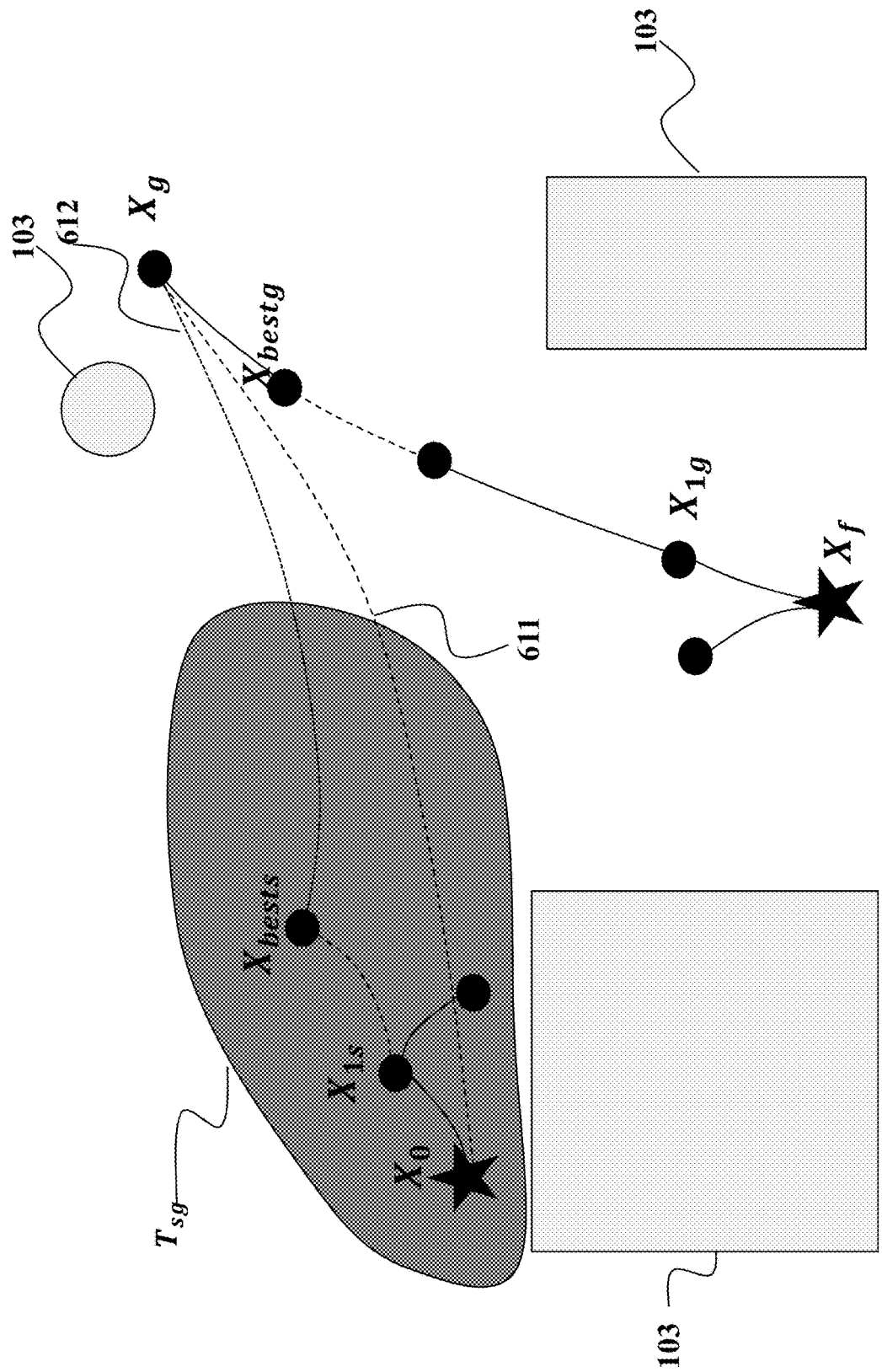
FIG. 6B shows the schematics of a method to determine a cost $F(X)$ for a node X when the target tree includes multiple nodes according to one embodiment.

FIG. 6B shows the schematics of a method to determine a cost F(X) for a node X when the target tree includes multiple nodes according to one embodiment. As shown in FIG. 6B, expanding $X_0$ leads to a tree $\mathcal{T}_s$ of nodes with subscript s, whereas expanding $X_f$ leads to a tree $\mathcal{T}_g$ of nodes with subscript g. Assume that $\mathbb{L}_g$ is selected 511 for growing, and specifically node $X_{bestg}$ is selected for expansion since it has the lowest cost among $\mathbb{L}_g$. Its expansion, with a control action $A_g$, results in a child node $X_g$. The cost of the node $X_g$ is given by the sum of its arrival cost and estimated cost-to-go:

$$F(x_g)=g(X_f,X_g)+h(X_g,X_0).$$

Note that the estimated cost-to-go approximates the path-cost between $X_g$ and $X_0$.

In some embodiments, $h(X_g,X_0)$ is approximated as $l_e(X_g,X_0)$ and $l_c(X_g,X_0)$ as above. In another embodiment, $h(X_g,X_0)$ is approximated as follows $$h(X_g,X_0)=h(X_g,X_{bests})+g(X_0,X_{bests}),$$

where $X_{bests}$ is the node of the list $\mathbb{L}_s$ having the lowest cost, $g(X_0,X_{bests})$ is the arrival cost (third cost) from $X_0$ to $X_{bests}$ and is exactly known, and $h(X_g, X_{bests})=l_e(X_g, X_{bests})+l_c(X_g, X_{bests}))$ is an estimate of the cost-to-go between $X_g$ and $X_{bests}$. This definition of the estimated cost-to-go has a significant advantage over the previously estimated cost-to-go: $h(X_g,X_0)=l_e(X_g,X_0)+l_c(X_g,X_0)$, because the former only estimates the path-cost between $X_g$ and $X_{bests}$.

In one embodiment, $X_{bests}$ is the node of the tree $\mathcal{T}_s$ which is closest to $X_g$. In another embodiment, $X_{bests}$ is the node list $\mathcal{T}_s$ which is obtained by solving the following optimization problem $$X_{bests}=\arg\min_{X\in X_{nears}}(g(X_0,X)+h(X,X_g))$$

where $X_{nears}$ is a set defined as follows $$X_{nears}=\{X:d(X,X_g)\leq\gamma,X\in\mathcal{T}_s\}$$

Note that $\gamma$ is a positive finite constant, and $d(X_i,X_1)$ is a distance function between arbitrary two nodes $X_i$ and $X_j$. $X_{nears}$ contains all nodes on $\mathcal{T}_s$ which is within \gamma distance from $X_g$. $X_{bests}$ represents the node on the tree $\mathcal{T}_s$ which gives the minimum estimated cost-to-go $h(X_0,X_g)$.

As shown in FIG. 6B, kinematically/dynamically feasible paths 612 between $X_g$ and $X_{bests}$ are, with a higher probability, shorter (thus can be approximated better by $l_e(X_g, X_{bests}))$ than kinematically/dynamically feasible paths 611 between $X_0$ and $X_g$, and thus a kinematically/dynamically feasible path between $X_{bests}$ and $X_g$ is much less likely to collide obstacles, and offers much better estimate of the cost-to-go. Similarly, a cost of a node $X_s$ on the tree $\mathcal{T}_s$ can be estimated as follows $$F(X_s)=g(X_0,X_s)+h(X_s,X_{bestg})+g(X_{bestg},X_f),$$

where $X_{bestg}$ is the node of the list $\mathbb{L}_g$ having the lowest cost, $g(X_{bests},X_f)$ is the arrival cost (third cost) from $X_f$ to $X_{bestg}$ and is exactly known, and $h(X_s,X_{bestg})$ is the estimated cost-to-go from $X_s$ to $X_{bestg}$.

In one embodiment, $X_{bestg}$ is the node of the tree $\mathcal{T}_g$ which is closest to Xs. In another embodiment, $X_{bestg}$ is the node list $\mathcal{T}_g$ which is obtained by solving the following optimization problem $$X_{bestg} = \arg\min_{X \in X_{nearg}}(g(X_s,X)+h(X,X_f))$$

where $X_{nearg}$ is a set of nodes on $\mathcal{T}_g$ such that $$X_{nearg}=\{X:d(X,X_s)\leq\gamma, X \in \eta_g\}.$$

$X_{nearg}$ includes all nodes on $\mathcal{T}_g$ which is within \gamma distance from $X_s$. $X_{bestg}$ represents the node on the tree $\mathcal{T}_g$ which gives the minimum estimated cost-to-go $h(X_s,X_f)$.

Figure 6C:
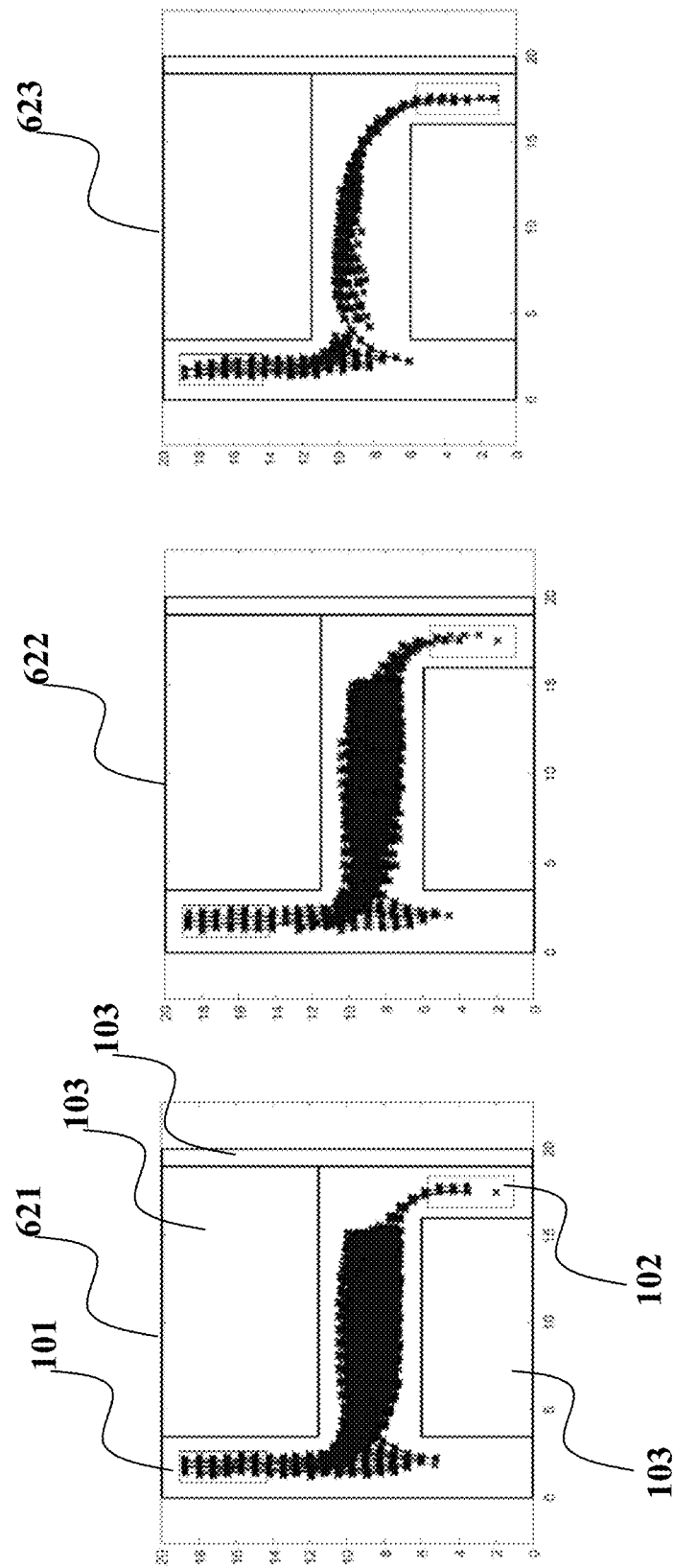
FIG. 6C shows schematics of examples illustrating benefits of different embodiments.

FIG. 6C shows schematics of examples illustrating benefits of different embodiments. In these examples, the vehicle needs to move from an initial state 101 to a target state 102, within an environment including various obstacles 103. A method without prioritizing control actions leads to a dense and complex tree 621 that includes of 6339 nodes according to a simulation. An embodiment with deterministic node expansion based on prioritized motion primitives achieves the desired motion with a simpler tree 622 that has only 2465 nodes. An embodiment that uses a doubletree construction, achieves the desired motion with an even more simpler tree 623 of only 1325 nodes.

Figure 7A:
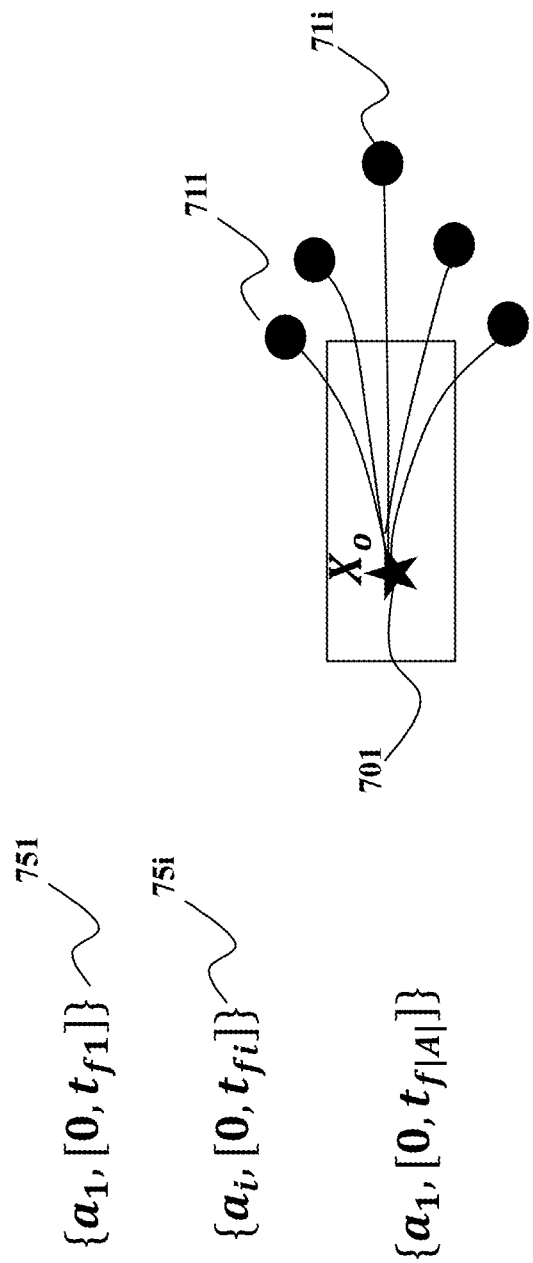
FIG. 7A shows a schematic that illustrates primitive motions associated with a set of control actions $\mathbf{A}$ and integration times $\mathbf{T}$ according to some embodiments.

FIG. 7A shows a schematic that illustrates primitive motions associated with a set of control actions A and integration times T according to some embodiments. Given the initial condition $X_o$ 701 of the vehicle model, applying primitive motion 751 corresponding to a left turn movement with a curvature yields a child node 711. Similarly, applying primitive 75i corresponding to a different movement, e.g., a straight movement or a turn movement with different curvature, yields a child node 71i. The set of all control actions A and the set of integration times T are designed such that distances between all node candidates of a given expandable node are at least greater than a certain threshold δ defining sparsity of the graph. In some embodiments, the distance function between two nodes corresponding to states $X_i$ and $X_j$ are defined as a weighted p-norm of the vector $X_i-X_j$: $|X_i-X_j|_p$.

In some embodiments, the kinematic vehicle model is used to generate node candidates based on the primitive motions, where a primitive motion includes a control action $A_i:(s_i,v_i)$ and integration time $t_{fi}$. Specifically, $s_i$ and $v_i$ is a steering angle of the vehicle steering wheel and a longitudinal velocity of the vehicle, respectively. In some embodiment, $s_i$, $1 \leq i \leq |\mathbb{A}|$ uniformly distributes over $[-1,1]$; and $v_i$ only takes value on $\{-1,+1\}$.

Alternatively, the dynamic vehicle model can be used to generate node candidates based on the primitive motions, where a primitive motion includes a control action $A_i:(a_{si}, a_{vi})$ and integration time $t_{fi}$. Specifically, $a_{si}$ and $a_{vi}$ is a steering velocity of the vehicle steering wheel and a longitudinal acceleration of the vehicle, respectively.

Some embodiments perform a node expansion, in addition to a node selection, in a deterministic manner to reduce the need to explore the space around the node with all possible primitive motions. To that end, an embodiment selects a first collision free primitive motion that reduces the cost of the expandable node, i.e., without testing subsequent primitive motions. To further reduce the computational burden, some embodiments order a set of primitive motions based on similarity of each of the primitive motions to a primitive motion defining an edge of the graph leading to the expandable node and tests the primitive motions in that order. These embodiments encourage smoothness of vehicle movement, as human operator would want, and, in practice, help to reduce the complexity of the constructed graph.

Figure 7B:
FIG. 7B shows an ordered list of primitive motions used by some embodiments to expand a node.

FIG. 7B shows an ordered list 720 of primitive motions used by some embodiments to expand a node. Some embodiments are based on understanding that there is no need to test all possible primitive motions, only one that is collision free and reduces the cost of the node we want to expand. In addition, if one control action reduces the cost of a parent node, similar control action probably also would reduce the cost of the child node. To that end, if a forward right primitive motion of a parent node is collision free, it make sense to start testing the motion primitives in an order governed by the similarity to the control action leading to the parent node.

To that end, one embodiment tests the primitive motions starting with a primitive motion of an edge leading to the expandable node. Additionally, or alternatively, one embodiments, to increase space awareness of the graph, tests the primitive motions starting with primitive motions of a driving mode including a primitive motion of an edge leading to the expandable node. For example, the driving mode can be a forward driving mode or a backward driving mode, in which the forward driving mode includes forward primitive motions defining a straight movement, a right turn movement, and a left turn movement in a forward direction, and the backward driving mode includes backward primitive motions defining a straight movement, a right turn movement, and a left turn movement in a backward direction. Additionally, or alternatively, the driving mode can be a straight driving mode or a turn driving mode, wherein the turn driving mode includes different primitive motions for turning movements of the vehicle with different curvatures.

Figure 8A:
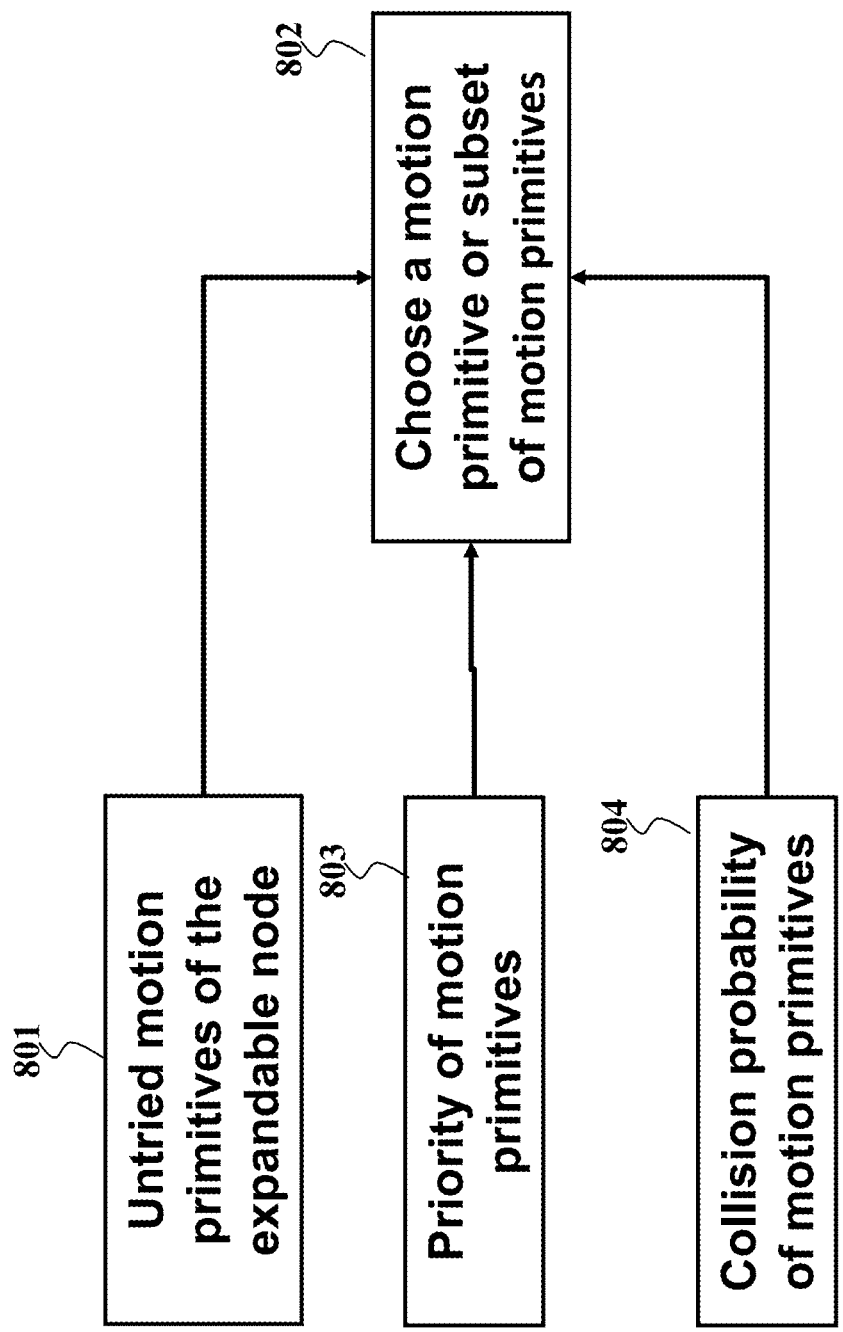
FIG. 8A shows a block diagram of a method for determining a motion primitive or a subset of motion primitives to expand a selected node according to one embodiment.
Figure 8B:
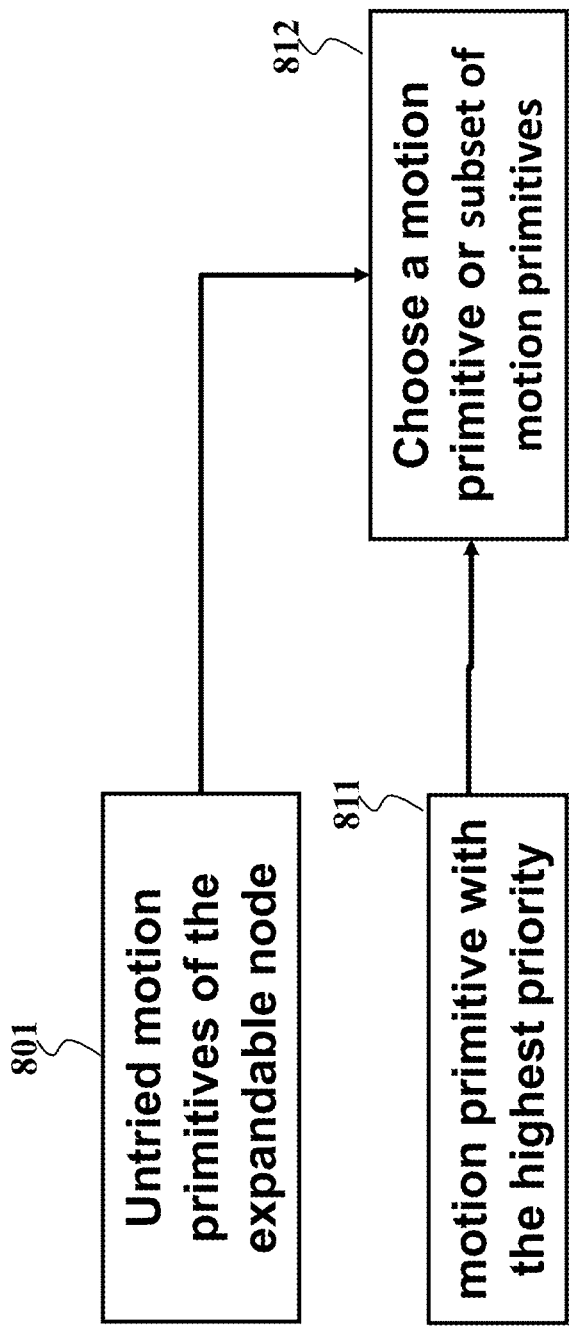
FIG. 8B shows a block diagram of a method for selecting a motion primitive during the expansion of the expandable node according to another embodiment.

FIG. 8A shows a block diagram of a method for determining 541 a motion primitive or a subset of motion primitives to expand a selected node $X_{best}$ according to one embodiment. The embodiment selects 802 a motion primitive or a subset of motion primitives according to untried motion primitives, priority of untried motion primitives 803, and collision probability of untried motion primitives 804. The information 803 and 804 can be readily inferred from properties of the node 441c and 441d, as shown in FIG. 4C FIG. 8B shows a block diagram of a method for selecting a motion primitive during the expansion of the expandable node $X_{best}$ according to another embodiment. The embodiment selects 802 a motion primitive among untried motion primitives 801 such that the distance between the motion primitive and the motion primitive with the highest priority 441e is minimal. This rule is based on the realization that the motion primitive with highest priority 441e is more likely to produce a child node having the lowest cost. That is: the highest priority is assigned to the motion primitive, which gives the lowest node cost among all tried motion primitives. In case that no motion primitive has been tried, motion primitive with the highest priority 441e of $X_{best}$ is inherited from its parent node.

If a node is the root node of a tree, the collision probability of all motion primitives are zero (meaning all motion primitives are assumed to be collision free), and the priority of motion primitives 441d are initialized to 1 (means all motion primitives have the same priority). For a child node, its priority and collision probability are initially inherited from its parent node.

In some embodiment, the collision probability of motion primitives of an expandable node is updated 543 according to the outcome of collision check for its child node candidates. Similarly, the priority of motion primitives of an expandable node is updated 544 according to the node cost result from tried motion primitives. For example, among all child nodes of the expandable node $X_{best}$, the priority of a motion primitive is defined as a monotonic function of the cost of the resultant child node: the lower the cost of the child node is, the higher the priority of the motion primitive is.

Figure 9:
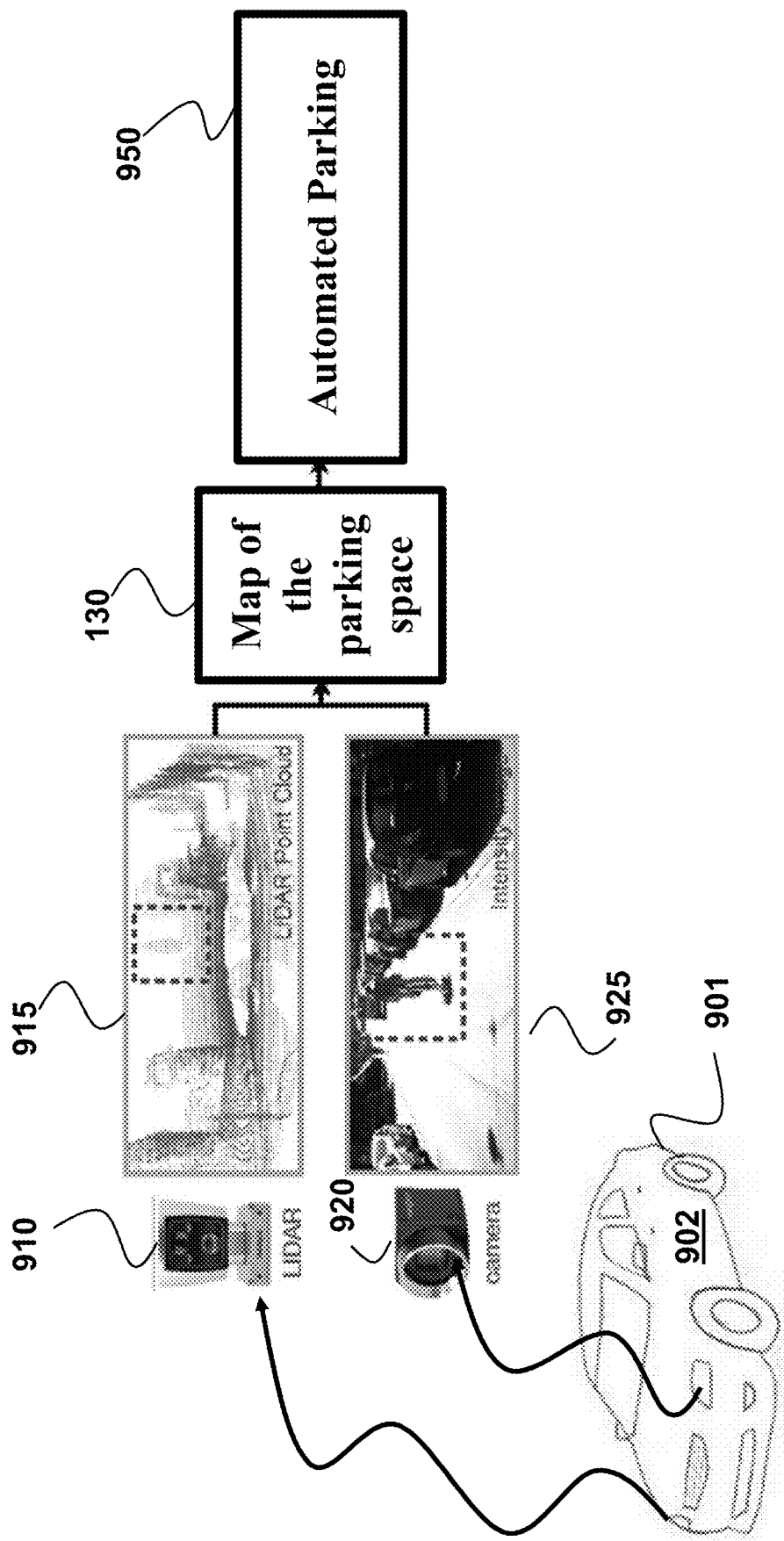
FIG. 9 shows a schematic of a system according to one embodiment.

FIG. 9 shows a schematic of a system according to one embodiment. The system includes a vehicle 901 including a processor 902 configured for performing an automated parking 950. The vehicle also includes at least one sensor, such as a LIDAR 910 and/or a camera 920. The LIDAR sensor 910 is the low-resolution first sensor and the camera 920 is the high-resolution second sensor. The sensor 910 and/or 920 is operatively connected to the processor 902 and is configured for sensing information indicative of the geometry of at least part of the parking space. Using this information, the processor 902 determines and/or updates the map of the parking space 130. To that end, the processor 902 performs the automated parking 950 using the map 130.

Figure 10:
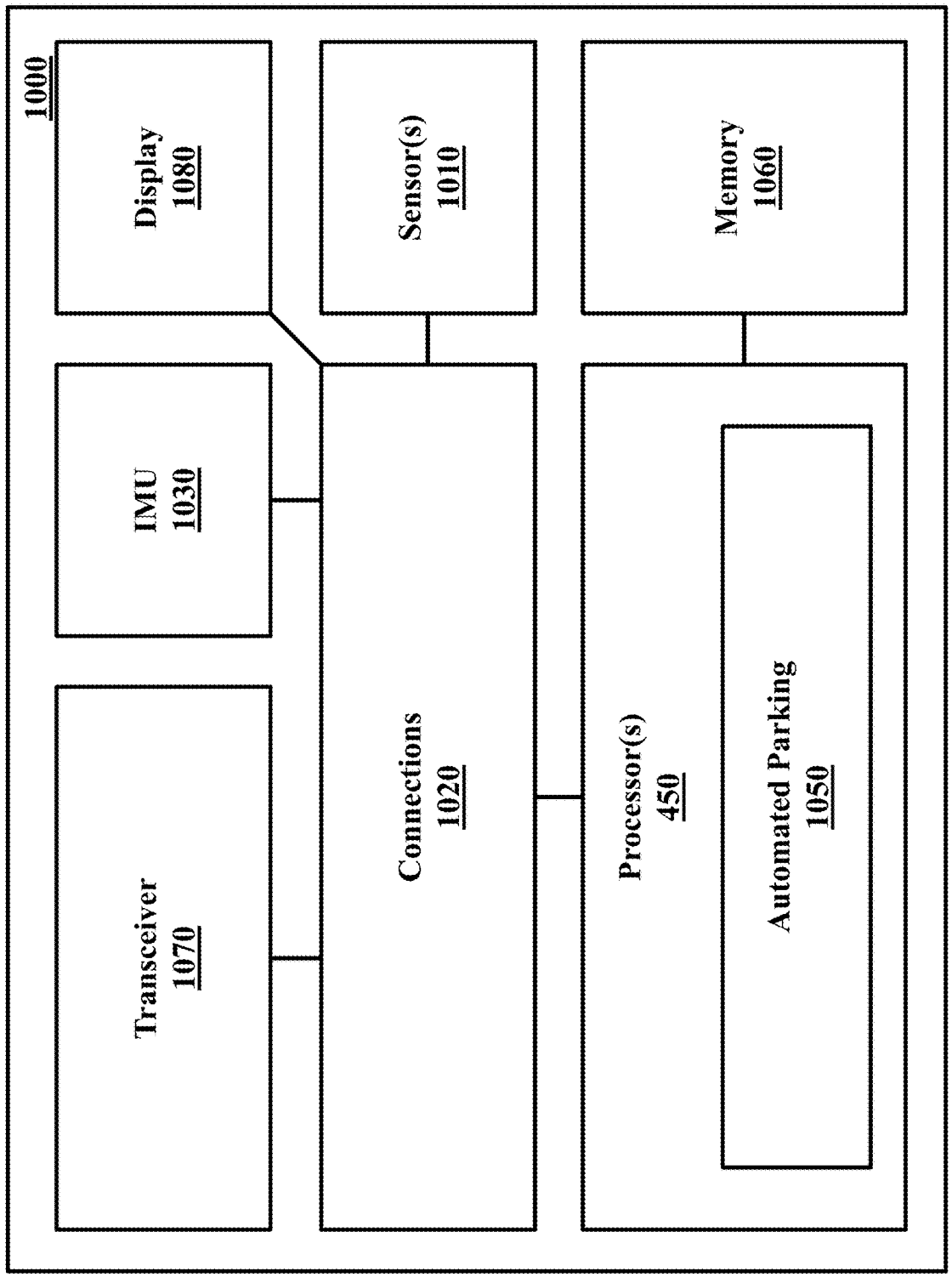
FIG. 10 shows a block diagram of an automated parking system according to some embodiments.

FIG. 10 shows a block diagram of an automated parking system 1000 according to some embodiments. The system 1000 can be implemented internal to the vehicle 901. Additionally, or alternatively, the system 1000 can be communicatively connected to the vehicle 901.

The system 1000 can include one or combination of a camera 1010, an inertial measurement unit (IMU) 1030, a processor 1050, a memory 1060, a transceiver 1070, and a display/screen 1080, which can be operatively coupled to other components through connections 1020. The connections 1020 can comprise buses, lines, fibers, links or combination thereof.

The transceiver 1070 can, for example, include a transmitter enabled to transmit one or more signals over one or more types of wireless communication networks and a receiver to receive one or more signals transmitted over the one or more types of wireless communication networks. The transceiver 1070 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 1000 can comprise image sensors such as CCD or CMOS sensors, lasers and/or camera 1010, which are hereinafter referred to as "sensor 1010". For example, the sensor 1010 can convert an optical image into an electronic or digital image and can send acquired images to processor 1050. Additionally, or alternatively, the sensor 1010 can sense the light reflected from a target object in a scene and submit the intensities of the captured light to the processor 1050.

For example, the sensor 1010 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 1010 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1010. For example, in some embodiments, the sensor 1010 includes RGBD cameras, which may capture per-pixel depth (D) information when the depth sensor is enabled, in addition to color (RGB) images.

As another example, in some embodiments, the sensor 1010 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 410. Depth information can be obtained by measuring the time that the light pulses take to travel to the objects and back to the sensor.

As a further example, the depth sensor can take the form of a light source coupled to the sensor 1010. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1010 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1000 can be operatively connected to multiple sensors 1010, such as dual front cameras and/or a front and rear-facing cameras, which may also incorporate various sensors. In some embodiments, the sensors 1010 can capture both still and video images. In some embodiments, the sensor 1010 can include RGBD or stereoscopic video cameras capable of capturing images at, e.g., 30 frames per second (fps). In one embodiment, images captured by the sensor 1010 can be in a raw uncompressed format and can be compressed prior to being processed and/or stored in memory 1060. In some embodiments, image compression can be performed by the processor 1050 using lossless or lossy compression techniques.

In some embodiments, the processor 1050 can also receive input from IMU 1030. In other embodiments, the IMU 1030 can comprise 3-axis accelerometer(s), 3-axis gyroscope(s), and/or magnetometer(s). The IMU 1030 can provide velocity, orientation, and/or other position related information to the processor 1050. In some embodiments, the IMU 1030 can output measured information in synchronization with the capture of each image frame by the sensor 1010. In some embodiments, the output of the IMU 1030 is used in part by the processor 1050 to fuse the sensor measurements and/or to further process the fused measurements.

The system 1000 can also include a screen or display 1080 rendering images, such as color and/or depth images. In some embodiments, the display 1080 can be used to display live images captured by the sensor 1010, fused images, augmented reality (AR) images, graphical user interfaces (GUIs), and other program outputs. In some embodiments, the display 1080 can include and/or be housed with a touchscreen to permit users to input data via some combination of virtual keyboards, icons, menus, or other GUIs, user gestures and/or input devices such as styli and other writing implements. In some embodiments, the display 1080 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 1080 or submitted to different applications that can be internal or external to the system 1000.

Exemplary system 1000 can also be modified in various ways in a manner consistent with the disclosure, such as, by adding, combining, or omitting one or more of the functional blocks shown. For example, in some configurations, the system 1000 does not include the IMU 1030 or the transceiver 1070. Further, in certain example implementations, the system 1000 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 1050 can be implemented using a combination of hardware, firmware, and software. The processor 1050 can represent one or more circuits configurable to perform at least a portion of a computing procedure or process related to sensor fusion and/or methods for further processing the fused measurements. The processor 1050 retrieves instructions and/or data from memory 1060. The processor 1050 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1060 can be implemented within the processor 1050 and/or external to the processor 1050. As used herein the term "memory" refers to any type of long term, short term, volatile, nonvolatile, or other memory and is not to be limited to any particular type of memory or number of memories, or type of physical media upon which memory is stored. In some embodiments, the memory 1060 holds program codes that facilitate the automated parking.

For example, the memory 1060 can store the measurements of the sensors, such as still images, depth information, video frames, program results, as well as data provided by the IMU 1030 and other sensors. The memory 1060 can store a memory storing a geometry of the vehicle, a map of the parking space, a kinematic model of the vehicle, and a dynamic model of the vehicle. In general, the memory 1060 can represent any data storage mechanism. The memory 1060 can include, for example, a primary memory and/or a secondary memory. The primary memory can include, for example, a random access memory, read only memory, etc. While illustrated in FIG. 4 as being separate from the processors 1050, it should be understood that all or part of a primary memory can be provided within or otherwise co-located and/or coupled to the processors 1050.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1060 and/or the processor 1050.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A system for controlling a movement of a vehicle from an initial state of the vehicle and a target state of the vehicle, comprising:
 a motion planner including a processor configured to
  construct a graph having multiple nodes defining states of the vehicle, wherein the nodes include an initial node defining the initial state of the vehicle and a target node defining the target state of the vehicle, wherein each pair of nodes in the graph is connected with an edge defined by one of collision free primitive motions moving the vehicle between the states of the connected nodes,
  determine a path through the graph connecting the initial node with the target node, such that the path defines a sequence of primitive motions moving the vehicle from the initial state to the target state; and transmit the sequence of primitive motions to a controller of the vehicle configured to control the movement of the vehicle using the sequence of primitive motions;

wherein the motion planner is configured to determine the graph by constructing an initial tree of nodes originating at the initial node and by constructing a target tree of nodes originating at the target node, wherein, to construct the initial tree or the target tree, the motion planner is configured to select an expandable node in the initial tree or the target tree based on a cost of the expandable node, and expand the graph by adding a child node connected to the expandable node with an edge defined by a collision free primitive motion, such that a cost of the child node is less than the cost of the expandable node, wherein the cost of a node is a minimum cost for reaching the target node from the initial node through the node and includes a first cost of a first path through nodes of the initial tree, a second cost of a second path through nodes of the target tree, and a third cost of a third path between nodes of the initial tree and the target tree, wherein the motion planner, to expand the expandable node, is configured to order a set of primitive motions based on similarity of each of the primitive motion in the set to a primitive motion defining an edge of the graph leading to the expandable node to produce an ordered set of primitive motions;

select, from the ordered set of primitive motions, a first collision free primitive motion that reduces the cost of the expandable node; and expand the graph with the first collision free primitive motion.

2. The system of claim 1, wherein the cost of the node is indicative of one or combination of a travel time of the vehicle from the initial state to the target state through the state of the node, a distance the vehicle travels from the initial state to the target state through the state of the node, a rate of change of a mode of movement of the vehicle traveling from the initial state to the target state through the state of the node.

3. The system of claim 1, wherein the motion planner, for selecting the expandable node, is configured to test multiple nodes in an order of their respective costs and to select the first of the tested nodes with the collision free primitive motion reducing the cost of the selected node as the expandable node.

4. The system of claim 1, wherein the motion planner tests the primitive motions starting with a primitive motion of an edge leading to the expandable node.

5. The system of claim 1, wherein the motion planner tests the primitive motions starting with primitive motions of a driving mode including a primitive motion of an edge leading to the expandable node.

6. The system of claim 1, wherein the motion planner tests the primitive motions starting with a primitive motion of the expandable node with a highest priority.

7. The system of claim 6, wherein the priority of the primitive motion of the expandable node increases if the primitive motion leads to a new node having lower cost than the expandable node; and decreases otherwise decreases.

8. The system of claim 7, wherein the increment or decrement of the priority is linearly proportional to difference of costs of the expandable node and the new node.

9. The system of claim 6, wherein the priority of the primitive motion of the expandable node is set to one if the primitive motion leads to the new node having a lower cost than the expandable node; and otherwise the priority of the primitive motion of the expandable node is set to zero.

10. The system of claim 1, wherein the nodes of the graph are non-uniformly distributed with different values of sparsity at different portions of the graph.

11. The system of claim 10, wherein the motion planner selects a value of the sparsity based on a length of a list of expandable nodes, wherein the value of the sparsity is defined by one or combination of an integration time of control actions forming the primitive motions, and a minimum allowed distance between the child node to a nearest node in the graph.

12. The system of claim 1, wherein the second path is determined by selecting its end node from the expandable node list of the target tree, wherein the end node has the lowest cost.

13. The system of claim 1, wherein the second path is determined by selecting its end node from the target tree, wherein the end node has is closest to an end node of the first path.

14. The system of claim 1, wherein the second path is determined by selecting its end node from the target tree, such that the sum of the second cost and third cost is minimized.

15. The system of claim 1, wherein the motion planner stops constructing the graph when the initial tree and the target tree are connected with a collision free Reed-Shepp's path.

16. The system of claim 1, wherein the target state defines a parking space for the vehicle.

17. The system of claim 1, further comprising:
a navigation system including at least one sensor to estimate the initial state of the vehicle and the target state of the vehicle.

18. A method for controlling a movement of a vehicle from an initial state of the vehicle and a target state of the vehicle, wherein the method uses a processor coupled with stored instructions implementing the method, wherein the instructions, when executed by the processor carry out steps of the method, comprising:

constructing a graph having multiple nodes defining states of the vehicle, wherein the nodes include an initial node defining the initial state of the vehicle and a target node defining the target state of the vehicle, wherein each pair of nodes in the graph is connected with an edge defined by one of collision free primitive motions moving the vehicle between the states of the connected nodes, wherein the graph includes an initial tree of nodes originating at the initial node and a target tree of nodes originating at the target node, wherein, to construct the initial tree or the target tree, the processor is configured to select an expandable node in the initial tree or the target tree based on a cost of the expandable node, and expand the graph by adding a child node connected to the expandable node with an edge defined by a collision free primitive motion, such that a cost of the child node is less than the cost of the expandable node, wherein the cost of a node is a minimum cost for reaching the target node from the initial node through the node and includes a first cost of a first path through nodes of the initial tree, a second cost of a second path through nodes of the target tree, and a third cost of a third path between nodes of the initial tree and the target tree;

determining a path through the graph connecting the initial node with the target node, such that the path defines a sequence of primitive motions moving the vehicle from the initial state to the target state; and transmitting the sequence of primitive motions to a controller of the vehicle configured to control the movement of the vehicle using the sequence of primitive motions, wherein to expand the expandable node, the method further includes ordering a set of primitive motions based on similarity of each of the primitive motion in the set to a primitive motion defining an edge of the graph leading to the expandable node to produce an ordered set of primitive motions;

selecting, from the ordered set of primitive motions, a first collision free primitive motion that reduces the cost of the expandable node; and expanding the graph with the first collision free primitive motion.

19. A non-transitory computer readable storage medium embodied thereon a program executable by a processor for performing a method, the method comprising:

constructing a graph having multiple nodes defining states of the vehicle, wherein the nodes include an initial node defining the initial state of the vehicle and a target node defining the target state of the vehicle, wherein each pair of nodes in the graph is connected with an edge defined by one of collision free primitive motions moving the vehicle between the states of the connected nodes, wherein the graph includes an initial tree of nodes originating at the initial node and a target tree of nodes originating at the target node, wherein, to construct the initial tree or the target tree, the processor is configured to select an expandable node in the initial tree or the target tree based on a cost of the expandable node, and expand the graph by adding a child node connected to the expandable node with an edge defined by a collision free primitive motion, such that a cost of the child node is less than the cost of the expandable node, wherein the cost of a node is a minimum cost for reaching the target node from the initial node through the node and includes a first cost of a first path through nodes of the initial tree, a second cost of a second path through nodes of the target tree, and a third cost of a third path between nodes of the initial tree and the target tree;

determining a path through the graph connecting the initial node with the target node, such that the path defines a sequence of primitive motions moving the vehicle from the initial state to the target state; and transmitting the sequence of primitive motions to a controller of the vehicle configured to control the movement of the vehicle using the sequence of primitive motions, wherein to expand the expandable node, the method further includes ordering a set of primitive motions based on similarity of each of the primitive motion in the set to a primitive motion defining an edge of the graph leading to the expandable node to produce an ordered set of primitive motions;

selecting, from the ordered set of primitive motions, a first collision free primitive motion that reduces the cost of the expandable node; and expanding the graph with the first collision free primitive motion.

* * * * *